United States Patent
Choi et al.

(10) Patent No.: US 7,646,439 B1
(45) Date of Patent: Jan. 12, 2010

(54) LIQUID CRYSTAL DISPLAY AND FABRICATING METHOD THEREOF

(75) Inventors: Seung Kyu Choi, Dae-gu (KR); Sang Moo Song, Daegu (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 10/326,399

(22) Filed: Dec. 23, 2002

(30) Foreign Application Priority Data

Apr. 20, 2002 (KR) .................... 10-2002-0021790

(51) Int. Cl.
*G02F 1/37* (2006.01)
*G02F 1/1343* (2006.01)

(52) U.S. Cl. ........................................ 349/27; 349/139

(58) Field of Classification Search ............. 349/33–37, 349/41–43, 27, 139
See application file for complete search history.

(56) References Cited

U.S. PATENT DOCUMENTS

| | | | | |
|---|---|---|---|---|
| 4,773,737 A | * | 9/1988 | Yokono et al. | 349/109 |
| 5,253,091 A | * | 10/1993 | Kimura et al. | 345/94 |
| 5,576,857 A | * | 11/1996 | Takemura | 349/42 |
| 5,656,824 A | | 8/1997 | Den Boer et al. | |
| 6,215,541 B1 | * | 4/2001 | Song et al. | 349/141 |
| 6,542,212 B2 | * | 4/2003 | Yoshida et al. | 349/141 |

FOREIGN PATENT DOCUMENTS

| | | | |
|---|---|---|---|
| JP | 06-148676 | * | 5/1994 |
| JP | 10-253987 | * | 9/1998 |
| JP | 2000-196098 | | 7/2000 |
| KR | 1999-016188 | | 3/1999 |
| KR | 10-2001-0003742 | | 1/2001 |

OTHER PUBLICATIONS

Merriam Webster's Collegiate Dictionary 10$^{TH}$ Ed. at p. 238 (Copyright 1999).*

* cited by examiner

*Primary Examiner*—Dung T. Nguyen
(74) *Attorney, Agent, or Firm*—McKenna Long & Aldridge

(57) ABSTRACT

This invention relates to a liquid crystal display and a fabricating method thereof that provides a uniform parasitic capacity of a thin film transistor. In a liquid crystal display and a fabricating method thereof according to the present invention, a source electrode of the thin film transistor is connected to the data line and a drain electrode of the thin film transistor is inserted into a hollowed part of the source electrode in the data line direction.

13 Claims, 17 Drawing Sheets

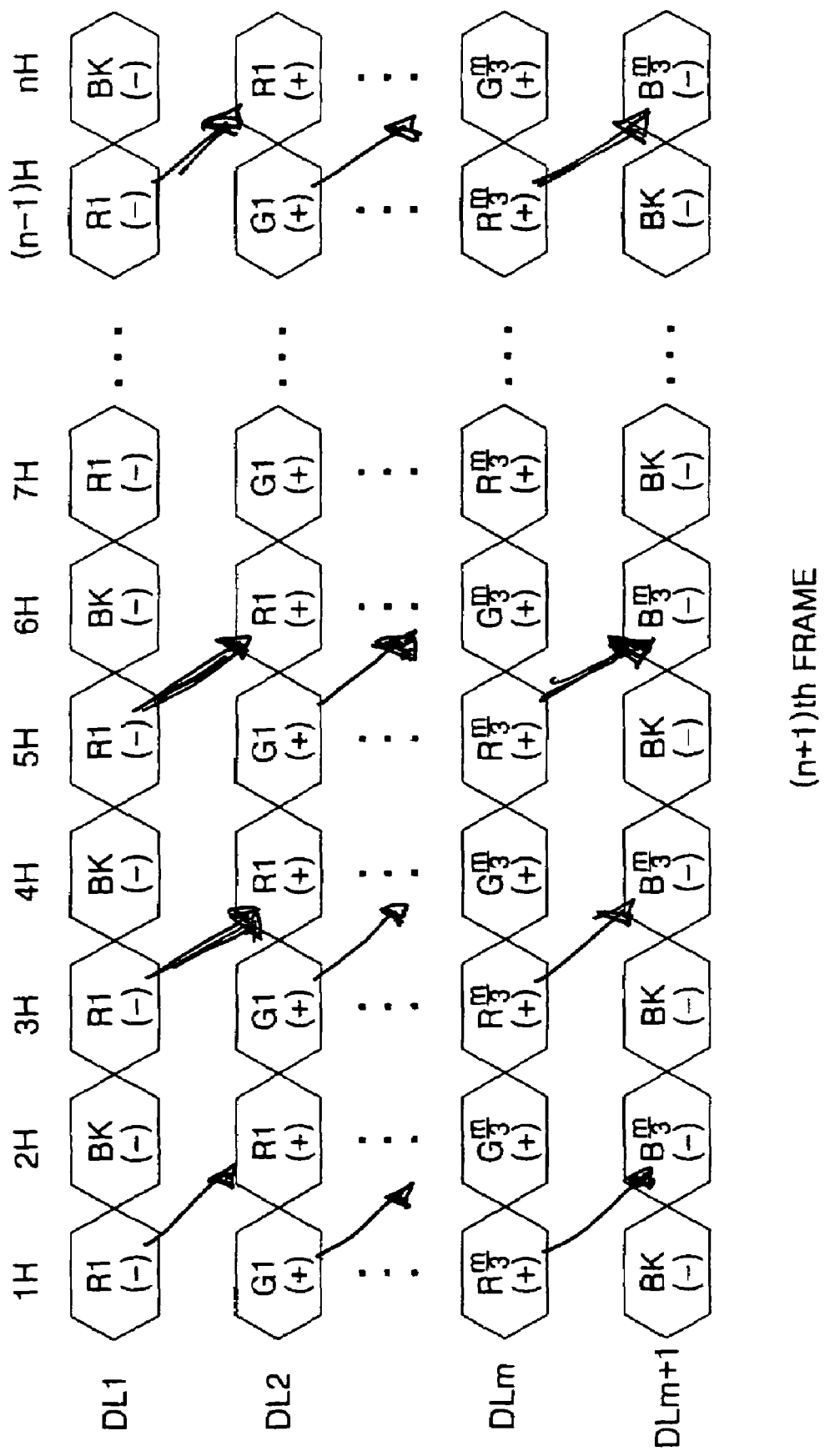

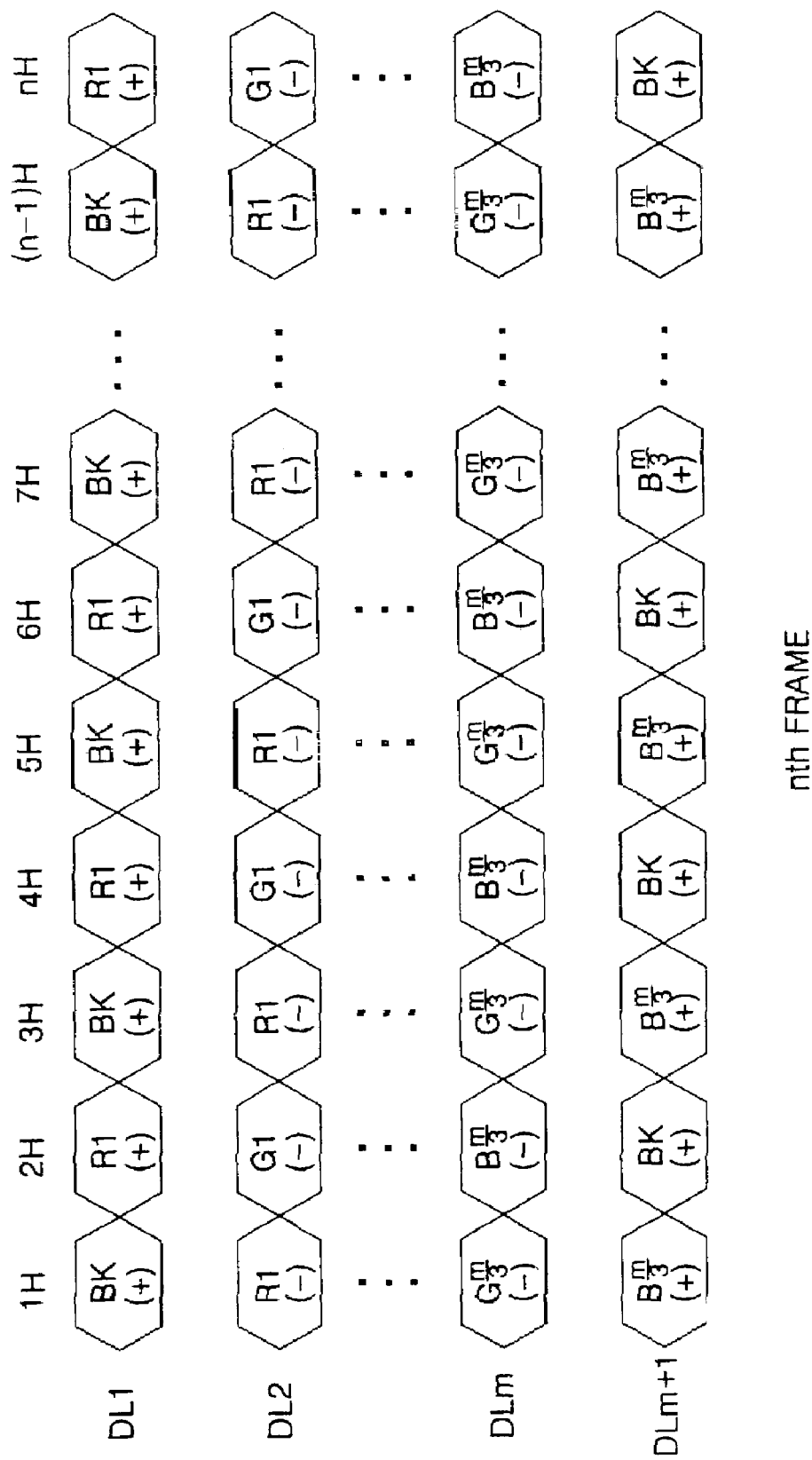

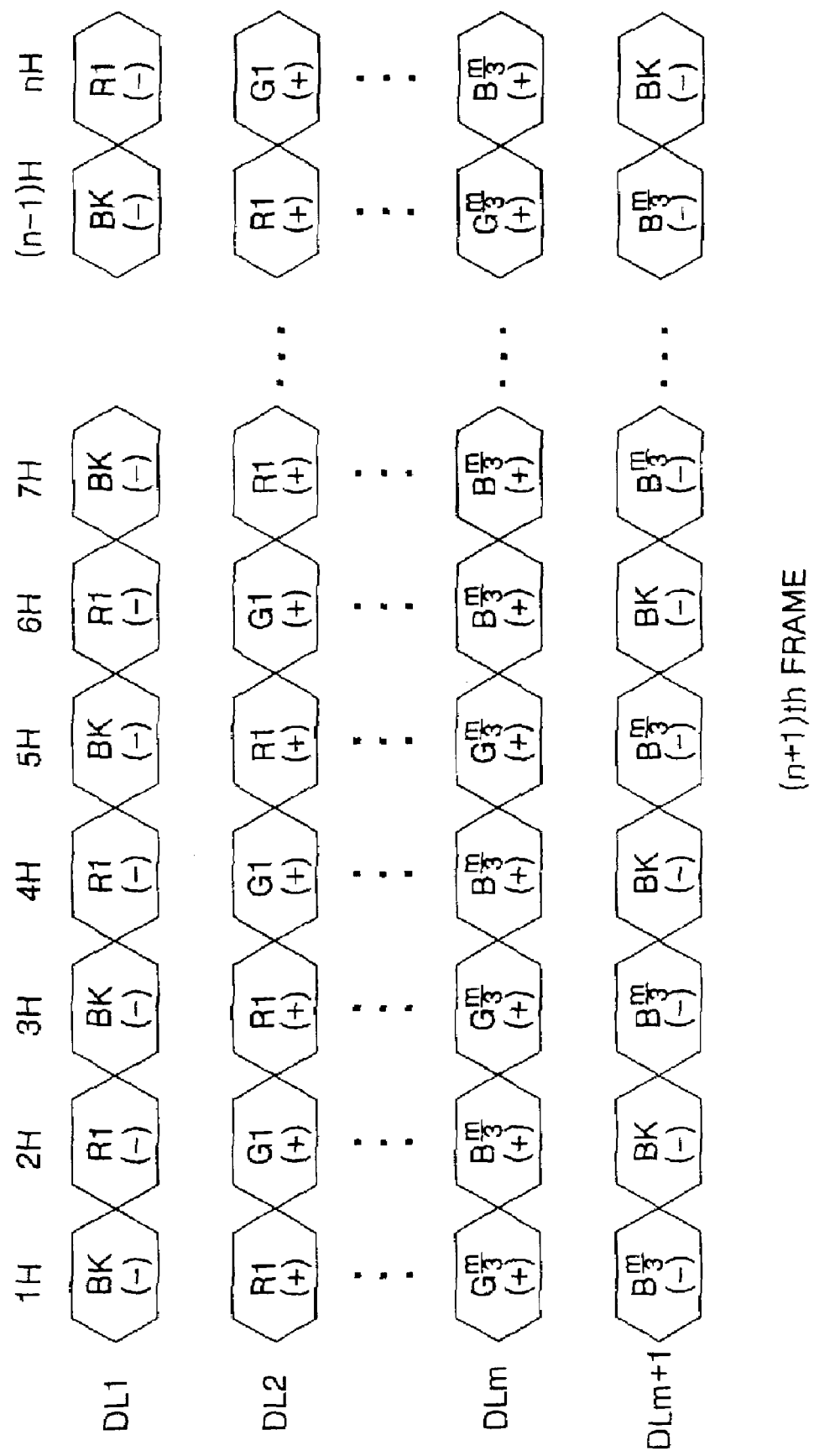

FIG.8A

| + | − | + | − | + | − | + | − |
|---|---|---|---|---|---|---|---|
| − | + | − | + | − | + | − | + |
| + | − | + | − | + | − | + | − |
| − | + | − | + | − | + | − | + |
| + | − | + | − | + | − | + | − |
| − | + | − | + | − | + | − | + |
| + | − | + | − | + | − | + | − |
| − | + | − | + | − | + | − | + |

ODD NUMBERED FRAME

FIG.8B

| − | + | − | + | − | + | − | + |
|---|---|---|---|---|---|---|---|
| + | − | + | − | + | − | + | − |
| − | + | − | + | − | + | − | + |
| + | − | + | − | + | − | + | − |
| − | + | − | + | − | + | − | + |
| + | − | + | − | + | − | + | − |
| − | + | − | + | − | + | − | + |
| + | − | + | − | + | − | + | − |

EVEN NUMBERED FRAME

FIG. 11
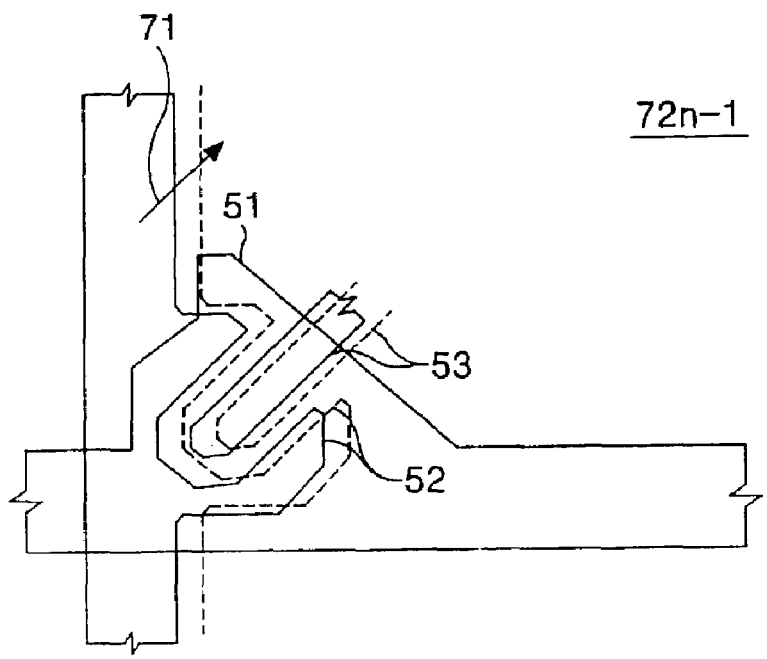
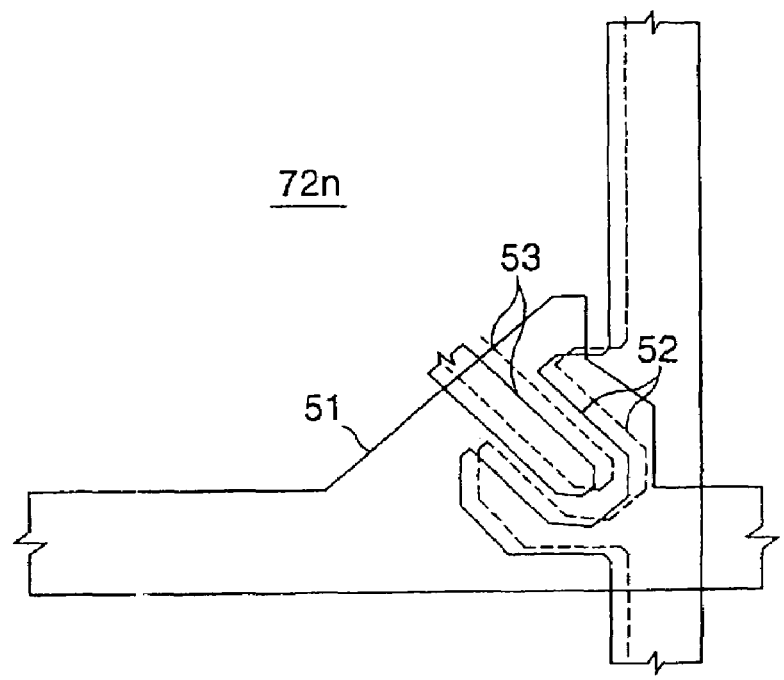

FIG.12
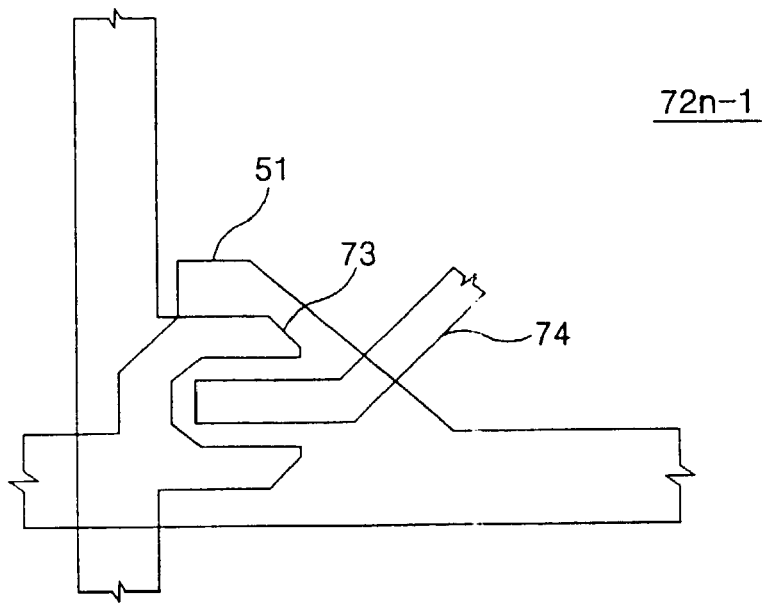
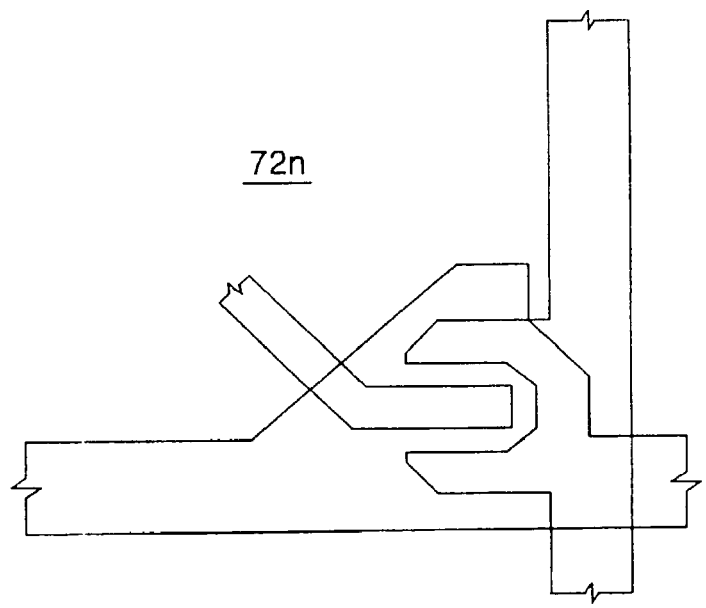

FIG. 14
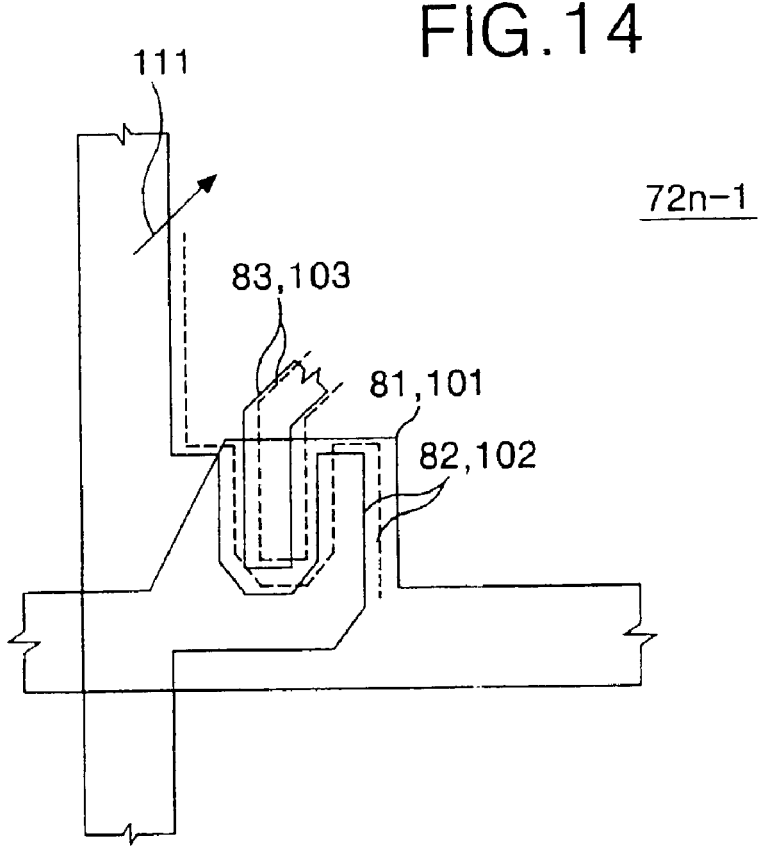
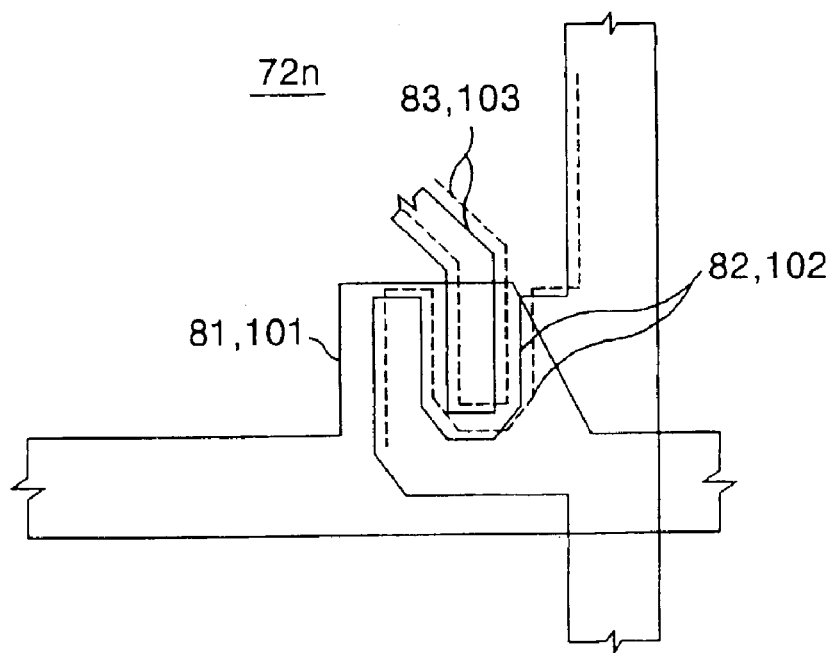

LIQUID CRYSTAL DISPLAY AND FABRICATING METHOD THEREOF

This application claims the benefit of Korean Patent Application No. P2002-21790, filed on Apr. 20, 2002, which is hereby incorporated by reference for all purposes as if fully set forth herein.

BACKGROUND OF THE INVENTION

1. Field of the Invention

The present invention relates to a liquid crystal display, and more particularly to a liquid crystal display and a fabricating method thereof that makes a parasitic capacity of a thin film transistor uniform.

2. Description of the Related Art

A liquid crystal display controls the light transmittance of liquid crystal cells in accordance with video signals to display a picture. An active matrix type liquid crystal display, where a thin film transistor (TFT) is formed at each liquid crystal cell, is capable of displaying an image with a more vivid picture quality when displaying a motion picture as compared with a passive matrix type liquid crystal display.

FIG. 1 is a view representing a related art liquid crystal display.

Referring to FIG. 1, a liquid crystal display includes a liquid crystal display panel 2 of active matrix type, a data driver 6 for supplying data to data lines DL1 to DLm of the liquid crystal display panel 2, and a gate driver 4 for supplying scanning pulses to gate lines GL1 to GLn of the liquid crystal display panel 2. 'Clc' represents the equivalent capacitance of the liquid crystal cell in FIG. 1.

Liquid crystal is interposed between an upper glass substrate and a lower glass substrate of the liquid crystal display panel 2. An array of m×n liquid crystal cells Clc is arranged in a matrix type in the liquid crystal display panel 2. Also, in the liquid crystal display panel 2, m data lines DL1 to DLm cross n gate lines GL1 to GLn and a TFT is formed at every crossing thereof for driving the liquid crystal cell Clc. The TFT is turned on in response to the scanning pulse to supply the data from the data lines DL to DLm to the liquid crystal cell Clc.

Referring to FIG. 2, a gate electrode 11 of the TFT is connected to the gate lines GL1 to GLn along the same horizontal line. A source electrode 12 of the TFT is connected to the data lines DL1 to Dlm along the same vertical line. A drain electrode 13 of the TFT is connected to a pixel electrode of the liquid crystal cell Clc at every liquid crystal cell Clc.

In FIG. 1, a gate driver 4 generates scanning pulses under control of a timing controller (not shown) and sequentially supplies the scanning pluses to the gate lines GL1 to GLn. The gate driver 4 includes a shift register for sequentially generating the scanning pulses and a level shift for shifting the swing width of the voltage of the scanning pulse to be suitable for driving the liquid crystal cell Clc. The TFT is turned on in response to the scanning pulse from the gate driver 4. The video data on the data line DL1 to DLm is supplied to the pixel electrode of the liquid crystal cell Clc when the TFT is turned on.

The data driver 6 samples the video data inputted from the timing controller (not shown) and latches them, then it converts the latched data into a gamma correction voltage, which is set as a pixel data voltage beforehand, to supply to the data lines DL1 to DLm at the same time. Herein, the data converted by the data driver 6 are synchronized with each scanning pulse every time the scanning pulse is generated and supplied to the data lines DL1 to DLm by one horizontal line portion during one horizontal period.

FIG. 2 is a plan view representing an enlarged part of a TFT array formed on a lower glass substrate of a liquid crystal display panel.

FIG. 3 is a sectional view particularly representing the section of the TFT by cutting off along the line A-A' in FIG. 2.

Referring to FIGS. 2 and 3, on a lower glass substrate 20 of the liquid crystal display panel, a TFT is formed at a crossing of the gate line 23 and the data line 24, a pixel electrode 19 is formed within the pixel area provided between the gate line 23 and the data line 24 and connected to the drain electrode 13 of the TFT. Also, a storage capacitor (CAP) is formed between the gate line 23 and the pixel electrode 19 on the lower glass substrate 20 of the liquid crystal display panel.

On the surface of the lower glass substrate 20, the gate electrode 11 of the TFT and the gate line 23 connected thereto are formed at the same time by depositing and patterning a metal. A projecting part 23a projected toward the pixel electrode 19 is formed at a lower side of the gate line 23. A gate insulating layer 16 of inorganic insulating material is formed on the entire surface of the lower glass substrate 20 and a gate metal layer including the gate electrode 11 and the gate line 23. A semiconductor layer 14 of semiconductor material is formed on the gate insulating layer 16 and then an ohmic contact layer 15, where the semiconductor material is doped with impurities, is deposited on top of the semiconductor layer 14.

On top of the ohmic contact layer 15 are formed the source electrode 12 of the TFT, the data line 24 connected thereto, and a drain electrode 13 facing the source electrode 12 with a specific channel in between. The source electrode 12 and the drain electrode 13 of the TFT overlaps with the gate electrode 11 while having the gate insulating layer 16, the semiconductor layer 14 and the ohmic contact layer 15 therebetween. A capacitor electrode 21 is formed to overlap with the projected part 23a of the gate line 23 at the same time as the data line 24, the source electrode 12 and the drain electrode 13 are formed.

The storage capacitor (CAP) has a gate line 23 and a capacitor electrode 21 overlapping with it and has a dielectric layer, i.e., the gate insulating layer 16 therebetween for being charged with voltage when a gate high voltage is applied to the previous gate line 23 and maintains the voltage charged until the data is inputted to the next frame, thereby restraining the voltage fluctuation of the pixel electrode 19.

In this way, after the TFT, the gate line 23 and the data line 24 are formed, a passivation layer 17 of inorganic insulating material or organic insulating material is formed on the entire surface of the lower glass substrate 20. A contact hole 18 for exposing part of the drain electrode 13 and a contact hole 22 for exposing part of the capacitor electrode 21 are formed in the passivation layer 17.

A pixel electrode 19 of transparent conductive material such as indium-tin-oxide (ITO) etc. is formed on the passivation layer 17. A projecting part 23a of the gate line is formed on the upper end of the pixel electrode 19 and a projecting part 19a of the pixel electrode 19 both overlap with the capacitor electrode 21. The pixel electrode 19 is connected to the drain electrode 13 and the capacitor electrode 22 via the contact holes 18 and 22.

Voltage Vp is applied to the liquid crystal cell of the liquid crystal display panel as in the following Formula 1.

$$\Delta V p = (Cgs/Clc + Cst + Cgs) \times \Delta Vg \quad \text{[FORMULA 1]}$$

Herein, Cgs is a capacitance between the gate electrode 11 and the source electrode 12 of the TFT or the gate electrode 11 and the drain electrode 13 of the TFT, Cst is a capacitance of the storage capacitor (CAP), and $\Delta Vg$ represents a potential difference between a gate high voltage and a gate low voltage of the scanning pulse supplied to the gate line 23.

As seen in Formula 1, when the same data voltage is supplied, for the voltage Vp applied to each liquid crystal cell Clc of the liquid crystal panel, the gate-source capacitance Cgs, the scanning voltage ΔVg, the capacitance Cst of the storage capacitor, and the capacitance Clc of the liquid crystal cell should be made the same. In the gate-source capacitance Cgs, it is possible to have a deviation because a mask is not aligned correctly when the source electrode 12 and the drain electrode 13 of the TFT are patterned using a photolithography process. In this case, because the voltage applied to the liquid crystal cell Clc is changed, the light transmittance of the liquid crystal cell Clc is changed to generate flickers, thereby deteriorating display quality.

SUMMARY OF THE INVENTION

Accordingly, the present invention is directed to a liquid crystal display and fabricating method thereof that substantially obviates one or more of problems due to limitations and disadvantages of the related art.

Accordingly, an advantage of the present invention to provide a liquid crystal display and a fabricating method thereof that makes a parasitic capacity of a thin film transistor uniform.

Additional features and advantages of the invention will be set forth in the description that follows, and in part will be apparent from the description, or may be learned by practice of the invention. Other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display includes a first thin film transistor for supplying data from a first data line to a first pixel electrode; and a second thin film transistor supplying data from a second data line adjacent to the first data line to a second pixel electrode adjacent to the first pixel electrode in the data line direction; and wherein a source electrode of the thin film transistor is connected to the data line and a drain electrode of the thin film transistor is inserted into a hollowed part of the source electrode in the data line direction.

Herein, the source electrode of the thin film transistor has a 'U' shape.

Herein, the hollowed part of each thin film transistor is parallel to the data line.

The liquid crystal display further includes a plurality of gate lines crossing the data line and connected to a gate electrode of the thin film transistor for supplying scanning voltage to the gate electrode of the thin film transistor.

Herein, the first thin film transistor is located at a crossing of the first data line and a first gate line, and the second thin film transistor is located at a crossing of a second gate line adjacent to the first gate line and the second data line.

The liquid crystal display further includes a first insulating layer formed between the source electrode and the drain electrode of the thin film transistor and the gate electrode of the thin film transistor; a semiconductor layer formed between the first insulating layer and the source electrode and the drain electrode of the thin film transistor; an ohmic contact layer formed between the semiconductor layer and the source electrode and the drain electrode of the thin film transistor; a capacitor electrode formed on the first insulating layer and overlapping with at least part of the gate line; a second insulating layer formed on the first insulating layer to cover the thin film transistor, the data line, the gate line and the capacitor electrode and on which there are formed contact holes for exposing the drain electrode and the capacitor electrode; and a pixel electrode formed on the second insulating layer to be connected to the drain electrode and the capacitor electrode via the contact holes.

Herein, at least one side edge of the drain electrode and the capacitor electrode has a comb shape.

A method of fabricating a liquid crystal display according to another aspect of the present invention includes forming a source electrode of a first thin film transistor to be connected to a first data line, and at the same time, forming a drain electrode of the first thin film transistor to be inserted into a hollowed part of the source electrode in a data line direction and to be connected to a first pixel electrode; and forming a source electrode of a second thin film transistor to be connected to a second data line adjacent to the first data line, and at the same time, forming a drain electrode of the second thin film transistor to be inserted into a hollowed part of the source electrode in a data line direction and to be connected to a second pixel electrode adjacent to the first pixel electrode.

The method further includes forming a gate electrode of the first and the second thin film transistor and a plurality of gate lines connected thereto on a glass substrate; forming a first insulating layer on the glass substrate to cover the gate electrodes and the gate lines; forming a semiconductor pattern on the first insulating layer; forming a capacitor electrode that overlaps with at least part of the gate line when forming the source and the drain electrode of the thin film transistor; forming an ohmic contact layer between the semiconductor pattern and the source electrode and between the semiconductor pattern and the drain electrode; forming a second insulating layer on the glass substrate to cover the thin film transistor, the data lines and the gate lines; forming contact holes on the second insulating layer for exposing the drain electrode and the capacitor electrode respectively; and forming a pixel electrode on the second insulating layer for being connected to the drain electrode and the capacitor electrode via the contact holes.

In the method, a mask for forming the semiconductor pattern and the ohmic contact layer and a mask for forming the source electrode, the drain electrode and the capacitor electrode are different from each other.

In the method, the semiconductor pattern, the ohmic contact layer, the source electrode, the drain electrode and the capacitor electrode are formed using the same mask.

In the method, the source electrode of the thin film transistor is patterned in a 'U' shape.

In the method, the hollowed part of each thin film transistor is parallel to the data line.

In the method, at least one side edge of the drain electrode and the capacitor electrode is formed in a comb shape.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 5b is a waveform diagram representing data supplied to the liquid crystal display panel shown in FIG. 4 during $(n+1)^{th}$ frame period;

FIG. 7a is a waveform diagram representing data supplied to the liquid crystal display panel shown in FIG. 6 during $n^{th}$ frame period;

FIG. 7b is a waveform diagram representing data supplied to the liquid crystal display panel shown in FIG. 6 during $(n+1)^{th}$ frame period;

FIGS. 8a and 8b are diagrams representing polarity of the data supplied to the liquid crystal display panel shown in FIGS. 4 and 6;

FIG. 11 is a plan view representing a mask alignment defects of the TFT array shown in FIG. 9;

FIG. 12 is a plan view representing an enlarged part of a TFT array where a hollow part of a source electrode is formed in a gate line direction;

FIG. 14 is a plan view representing a mask alignment defects of the TFT array shown in FIG. 13;

DETAILED DESCRIPTION OF THE ILLUSTRATED EMBODIMENTS

Reference will now be made in detail to the illustrated embodiments of the present invention, examples of which are illustrated in the accompanying drawings. Wherever possible, similar reference numbers will be used throughout the drawings to refer to the same or like parts.

With reference to FIGS. 4 to 16, embodiments of the present invention are explained as follows.

Figure 1:
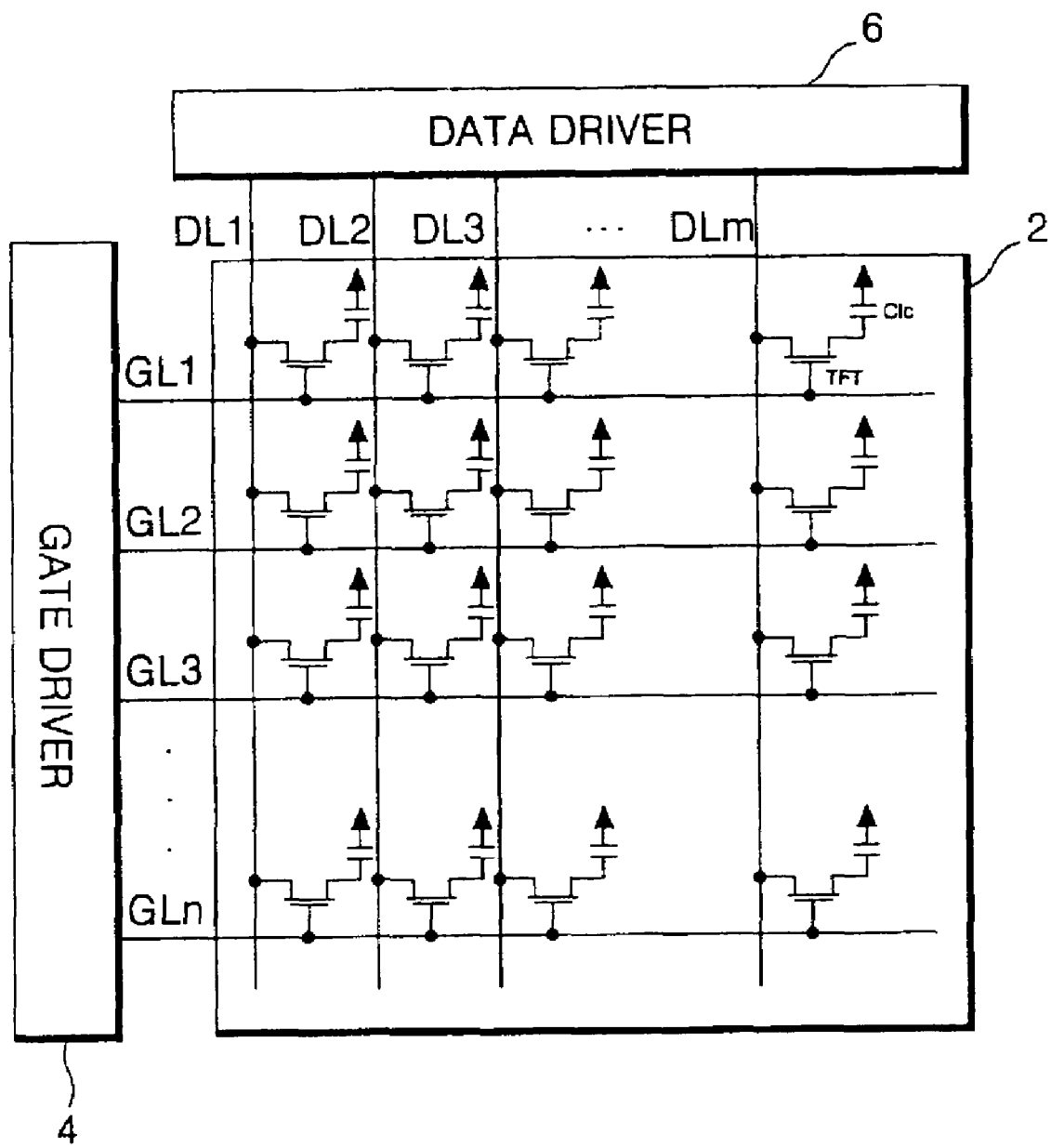
FIG. 1 is a view representing a related art liquid crystal display.
Figure 2:
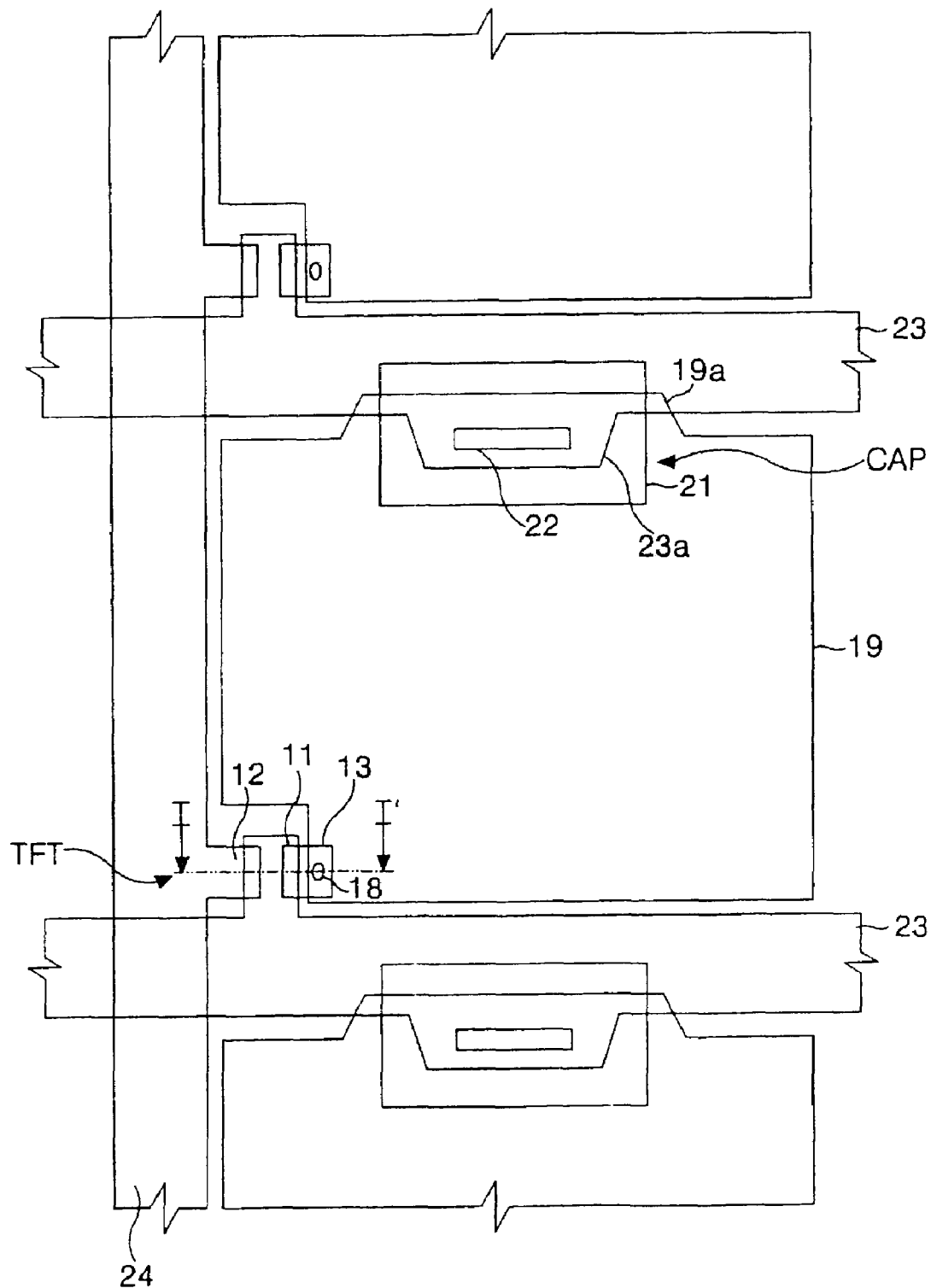
FIG. 2 is a plan view representing an enlarged part of a TFT array of the liquid crystal display shown in FIG. 1.
Figure 3:
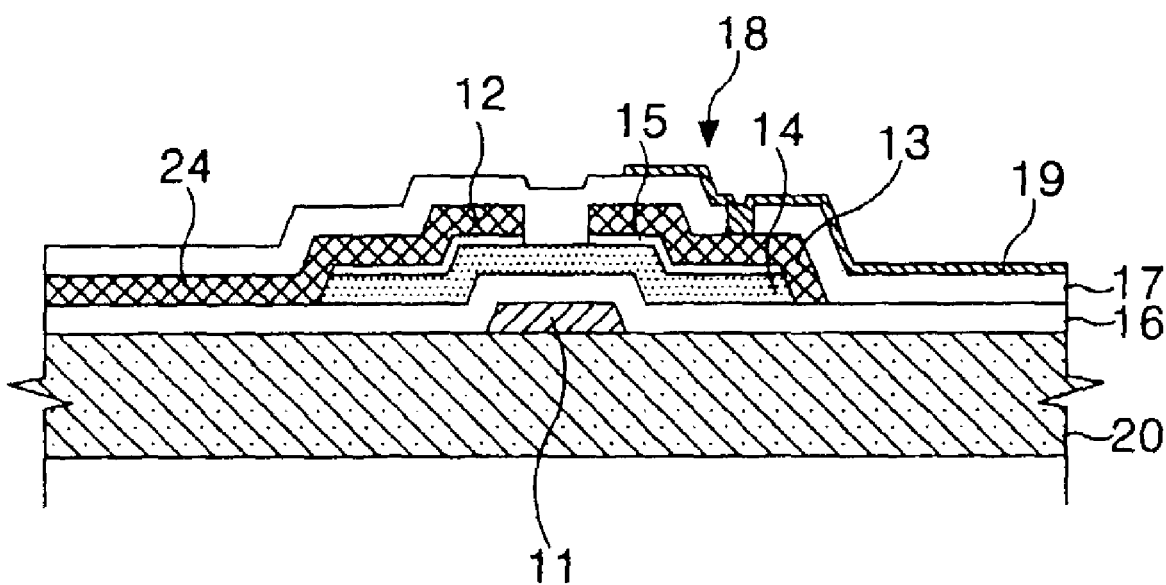
FIG. 3 is a sectional view cutting off along the line I-I' of FIG. 2.
Figure 4:
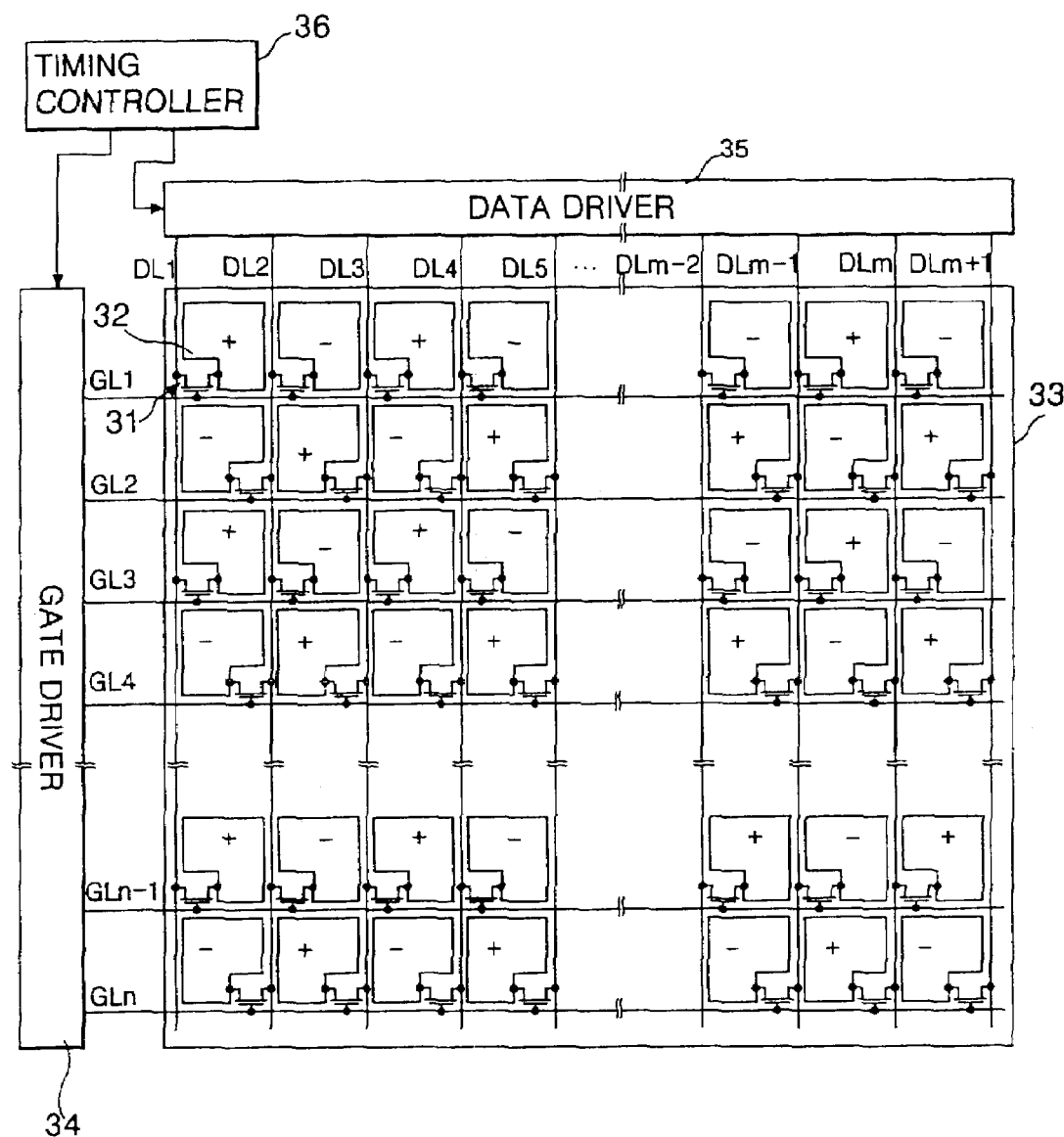
FIG. 4 is a view representing a liquid crystal display according to the first embodiment of the present invention.

FIG. 4 is a view representing a liquid crystal display according to the first embodiment of the present invention.

Referring to FIG. 4, the liquid crystal display according to the first embodiment of the present invention includes a liquid crystal display panel 33 where TFTs are arranged in a zigzag shape between two adjacent data lines DL1 to DLm+1, a gate driver 34 for driving gate lines GL1 to GLn of the liquid crystal display panel 33, a data driver 35 for driving data lines DL1 to DLm+1 of the liquid crystal display panel 33, and a timing controller 36 for controlling the gate driver 34 and the data driver 35.

Liquid crystal (not shown) is interposed between an upper glass substrate and a lower glass substrate of the liquid crystal display panel 33. In the liquid crystal display panel 33 m×n liquid crystal cells Clc are arranged in a matrix type. Also, in the liquid crystal display panel 33, (m+1) data lines DL1 to DLm+1 cross n gate lines GL1 to GLn, and a TFT 31 is formed at every crossing thereof for driving the liquid crystal cell Clc. The TFTs 31 are turned on in response to scanning pulses to supply data on the data lines DL1 to DLm+1 to the liquid crystal cell Clc.

The TFTs 31 of odd numbered horizontal lines are located at crossings of the left data line DL1 to DLm of the liquid crystal cell and the odd numbered gate lines GL1, GL3, GL5, . . . , GLn–1, and the TFTs 31 of even numbered horizontal lines are located at crossings of the right data line DL2 to DLm+1 of the liquid crystal cell and the even numbered gate lines GL2, GL4, GL6, . . . , GLn.

The gate electrodes of the TFTs are connected to the gate lines GL1 to GLn. The source electrodes of the TFTs 31 located on the odd numbered horizontal lines are connected with the first to the $m^{th}$ data lines DL1 to DLm, and the source electrodes of the TFTs 31 located on the even numbered horizontal lines are connected with the second to the $(m+1)^{th}$ data lines DL2 to DLm+1. The drain electrodes of the TFTs 31 located on the odd numbered horizontal lines are connected to the pixel electrodes 32 of the liquid crystal cells Clc on the right side of the cells in the context of the figure, and the drain electrodes of the TFTs 31 located on the even numbered horizontal lines are connected to the pixel electrodes 32 of the liquid crystal cells Clc on the left side of the cells in the context of the figure.

Accordingly, the liquid crystal cells Clc located on the odd numbered horizontal lines are charged with data supplied from the data lines DL1 to DLm on the left side of the cells in the context of the figure, the liquid crystal cells Clc located on the even numbered horizontal lines are charged with data supplied from the data lines DL2 to DLm+1 on to the right side of the cells in the context of the figure.

The timing controller 36 supplies digital video data supplied from a digital video card (not shown) to the data driver 35. Also, the timing controller 36 generates a timing control signal for the data driver 35 and the gate driver 34 using a self-inputted horizontal/vertical synchronization signal H and V. The timing control signals for the data driver 35 are a source shift clock SSC, a source start pulse SSP, a polarity control signal POL and a source output enable signal SOE etc. The timing control signals for the gate driver 34 are a gate start pulse GSP, a gate shift clock GSC and a gate out enable signal GOE etc.

The gate driver 34 sequentially supplies scanning signals to the gate lines GL to GLn using the gate start pulse GSP, the gate shift clock GSC and the gate output enable GOE from the timing controller 36. The scanning pulse sequentially turns on the TFTs 31 of each horizontal line to select a scanning line to which data is supplied. The gate driver 34 includes a shift register sequentially generating the scanning pulses, and a level shifter for shifting the swing width of the voltage of the scanning pulse to be suitable for driving the liquid crystal cells Clc.

The data driver 35 outputs mth digital video data, inputted from the timing controller 36, intact during the odd numbered horizontal period, and shifts to the right by one channel during the even numbered horizontal period using the source shift clock SSC, the source start pulse SSP, the polarity control signal POL and the source output enable signal SOE from the timing controller 36. The data driver 36 converts the m digital video data, which are shifted by horizontal period unit, and blank data into positive polar gamma correction voltage or negative polar gamma correction voltage so as to convert the digital video data and the blank data into analog pixel voltage.

The blank data are voltage sampled as blank data existing between the data enable intervals by the timing controller 36 or generated at the inside of the timing controller 36. The pixel voltage converted into an analog type by a gamma correction voltage makes the polarity of the horizontally adjacent data opposite to one another as in a column inversion method by having the positive polar gamma correction voltage and the negative polar gamma correction voltage changed alternately every vertical line.

The (m+1) pixel voltages, which are inverted by the column inversion method by the data driver 36, are synchronized with the scanning pulse to be sequentially supplied to (m+1) data lines DL1 to DLm every horizontal period.

Figure 5A:
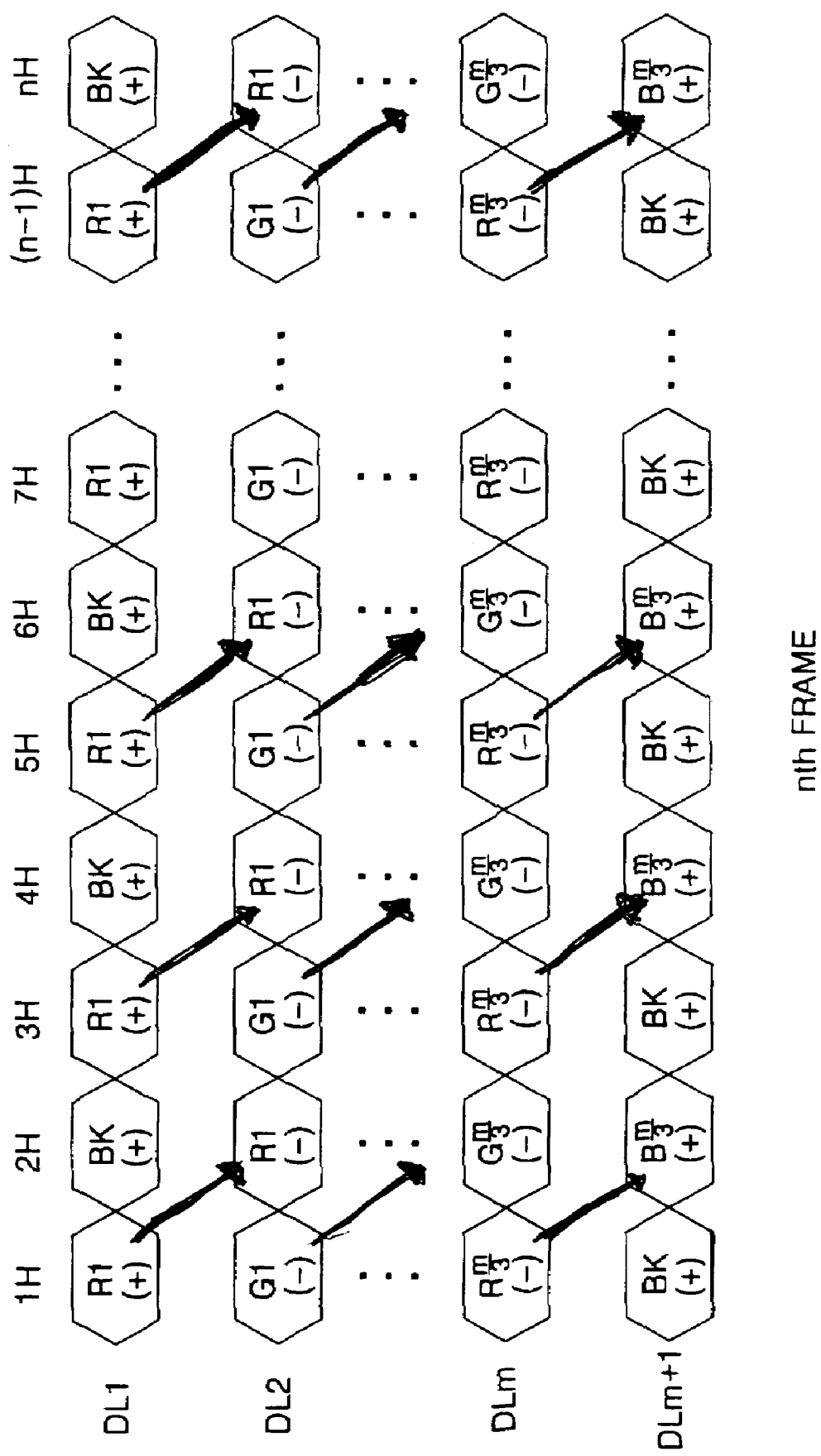
FIG. 5a is a waveform diagram representing data supplied to the liquid crystal display panel shown in FIG. 4 during $n^{th}$ frame period.

FIGS. 5a and 5b represent data supplied to the data lines DL1 to DLm+1 of the liquid crystal display panel 33 shown in FIG. 4 during the $n^{th}$ frame and the $(n+1)^{th}$ frame period.

Referring to FIG. 5a, in the odd numbered horizontal period 1H, 3H, . . . , (n−1)H of the $n^{th}$ frame, pixel voltages of red R, green G and blue B are supplied to the first to $m^{th}$ data lines DL1 to DLm, and at the same time, pixel voltages of blank data BK are supplied to the (m+1)th data line DLm+1. In the even numbered horizontal period 2H, 4H, . . . , nH of the $n^{th}$ frame, pixel voltages of red R, green G and blue B are supplied to the second to $(m+1)^{th}$ data lines DL2 to DLm+1, and at the same time, pixel voltages of blank data BK are supplied to the first data line DL1. During the $n^{th}$ frame period, positive polar pixel voltages are always applied to the odd numbered data lines DL1, DL3, DL5, . . . , DLm−1, DLm+1, and negative polar pixel voltages are always applied to the even numbered data lines DL2, DL4, DL6, . . . , DLm−2, DLm. In the $(n+1)^{th}$ frame, the polarity of the pixel voltages supplied to each of the data lines DL1 to DLm+1 is inverted as in FIG. 5b.

Referring to FIG. 5b, in the odd numbered horizontal period 1H, 3H, . . . , (n−1)H of the $(n+1)^{th}$ frame the same as in the odd numbered horizontal period 1H, 3H, . . . , (n−1)H of the $n^{th}$ frame, pixel voltages of red R, green G and blue B are supplied to the first to $m^{th}$ data lines DL1 to DLm, and at the same time, pixel voltages of blank data BK are supplied to the (m+1)th data line DLm+1. In the even numbered horizontal period 2H, 4H, . . . , nH of the $(n+1)^{th}$ frame the same as in the even numbered horizontal period 2H, 4H, . . . , nH of the $n^{th}$ frame, pixel voltages of red R, green G and blue B are supplied to the second to $(m+1)^{th}$ data lines DL2 to DLm+1, and at the same time, pixel voltages of blank data BK are supplied to the first data line DL1. During the $(n+1)^{th}$ frame period, negative polar pixel voltages are always applied to the odd numbered data lines DL1, DL3, DL5, . . . , DLm−1, DLm+1, and positive polar pixel voltages are always applied to the even numbered data lines DL2, DL4, DL6, . . . , DLm−2, DLm.

Figure 6:
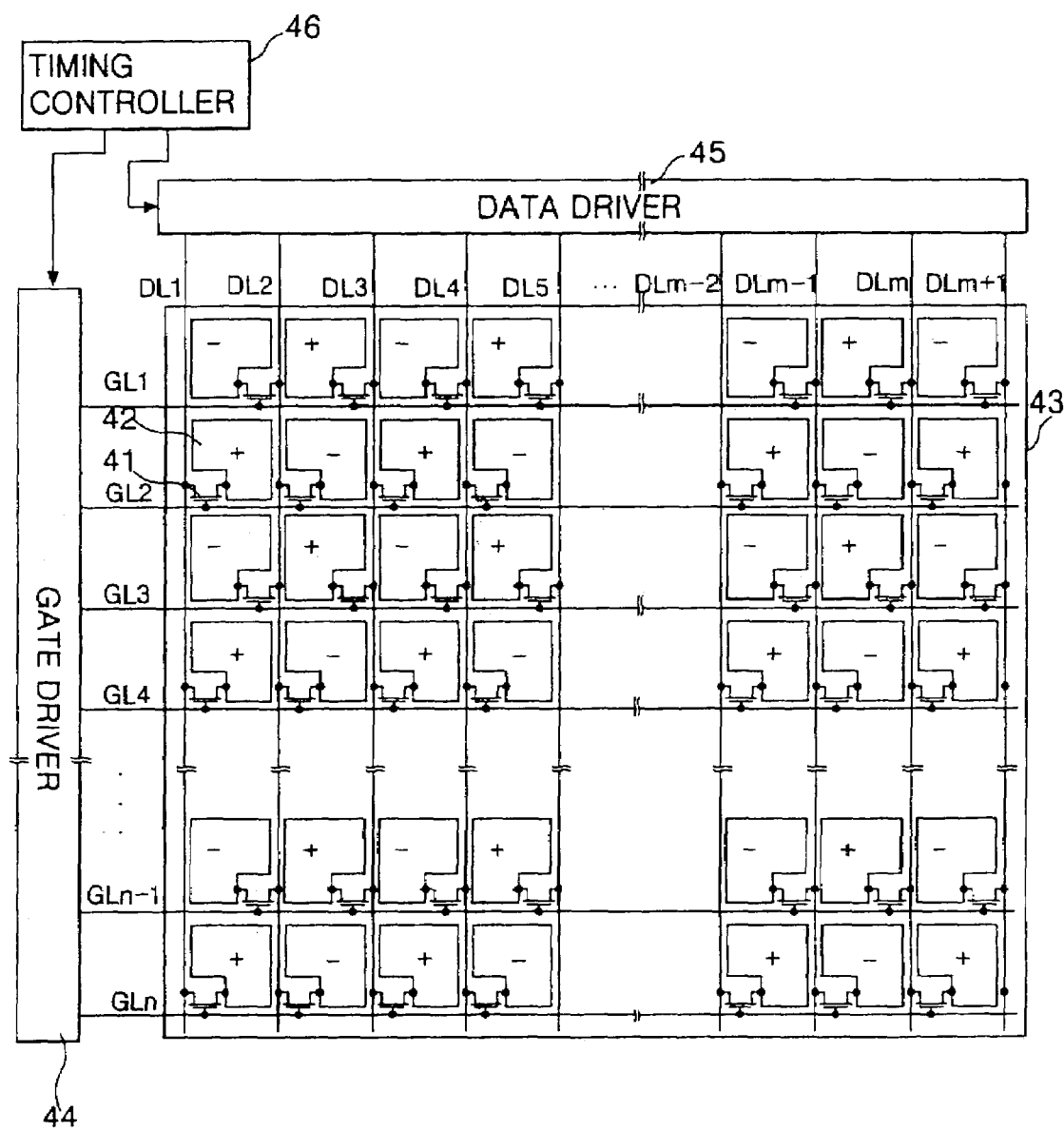
FIG. 6 is a view representing a liquid crystal display according to the second embodiment of the present invention.

FIG. 6 is a view representing a liquid crystal display according to the second embodiment of the present invention.

Referring to FIG. 6, the liquid crystal display according to the second embodiment of the present invention includes a liquid crystal display panel 43, where TFTs are arranged in a zigzag shape in a horizontal line direction. For the TFTs 41 of odd numbered horizontal lines to supply data from the second to the $(m+1)^{th}$ data lines DL2 to DLm+1 to liquid crystal cells and for the TFTs 41 of even numbered horizontal lines to supply data from the first to the $m^{th}$ data lines DL1 to DLm to liquid crystal cells; a gate driver 44 for driving gate lines GL1 to GLn of the liquid crystal display panel 43; a data driver 45 for driving data lines DL1 to DLm+1 of the liquid crystal display panel 43, and a timing controller 46 for controlling the gate driver 44 and the data driver 45 are provided.

In the liquid crystal display panel 43, (m+1) data lines DL1 to DLm+1 cross n gate lines GL1 to GLn, and a TFT 41 is formed every crossing thereof for driving the liquid crystal cell Clc. The TFTs 41 of odd numbered horizontal lines are located at crossings of the right data lines DL2 to DLm+1 of the liquid crystal cell and the odd numbered gate lines GL1, GL3, GL5, . . . , GLn−1. The TFTs 41 of even numbered horizontal lines are located at crossings of the left data line DL1 to DLm of the liquid crystal cell and the even numbered gate lines GL2, GL4, GL6, . . . , GLn.

The gate electrodes of the TFTs 41 are connected to the gate lines GL1 to GLn. The source electrodes of the TFTs 41 located on the odd numbered horizontal lines are connected with the second to the $(m+1)^{th}$ data lines DL2 to DLm+1, and the source electrodes of the TFTs 41 located on the even numbered horizontal lines are connected with the first to the $m^{th}$ data lines DL1 to DLm. The drain electrodes of the TFTs 41 located on the odd numbered horizontal lines are connected to the pixel electrodes 42 on the left side of the cells in the context of the figure, and the drain electrodes of the TFTs 41 located on the even numbered horizontal lines are connected to the pixel electrodes 32 on the right side of the cells in the context of the figure.

Accordingly, the liquid crystal cells Clc located on the odd numbered horizontal lines are charged with data supplied from the data lines DL2 to DLm+1 on the right side of the cells in the context of the figure, the liquid crystal cells Clc located on the even numbered horizontal lines are charged with data supplied from the data lines DL1 to DLm on the left side of the cells in the context of the figure.

The timing controller 46 supplies digital video data supplied from a digital video card (not shown) to the data driver 45. Also, the timing controller 46 generates a timing control signal for the data driver 45 and the gate driver 44 using a self-inputted horizontal/vertical synchronization signal H and V.

The gate driver 44 has practically the same composition and function as the gate driver 34 shown in FIG. 4.

The data driver 45 has practically the same composition and function as the data driver 35 shown in FIG. 4.

FIGS. 7a and 7b represent data supplied to the data lines DL1 to DLm+1 of the liquid crystal display panel shown in FIG. 6 during the $n^{th}$ frame and the $(n+1)^{th}$ frame period.

Referring to FIG. 7a, in the odd numbered horizontal period 1H, 3H, . . . , (n−1)H of the $n^{th}$ frame, pixel voltages of red R, green G and blue B are supplied to the second to $(m+1)^{th}$ data lines DL2 to DLm+1, and at the same time, pixel voltages of blank data BK are supplied to the first data line DL1. In the even numbered horizontal period 2H, 4H, . . . , nH of the $n^{th}$ frame, pixel voltages of red R, green G and blue B are supplied to the first to $m^{th}$ data lines DL1 to DLm, and at the same time, pixel voltages of blank data BK are supplied to the $(m+1)^{th}$ data line DLm+1. During the $n^{th}$ frame period, positive polar pixel voltages are always applied to the odd numbered data lines DL1, DL3, DL5, . . . , DLm−1, DLm+1, and negative polar pixel voltages are always applied to the even numbered data lines DL2, DL4, DL6, . . . , DLm−2, DLm. In the $(n+1)^{th}$ frame, the polarity of the pixel voltages supplied to each of the data lines DL1 to DLm+1 is inverted as in FIG. 7b.

Referring to FIG. 7b, in the odd numbered horizontal period 1H, 3H, . . . , (n−1)H of the $(n+1)^{th}$ frame, the same as in the odd numbered horizontal period 1H, 3H, . . . , (n−1)H of the $n^{th}$ frame, pixel voltages of red R, green G and blue B are supplied to the second to (m+1)$^{th}$ data lines DL2 to DLm+1, and at the same time, pixel voltages of blank data BK are supplied to the first data line DL1. In the even numbered horizontal period 2H, 4H, . . . , nH of the (n+1)$^{th}$ frame, the same as in the even numbered horizontal period 2H, 4H, . . . , nH of the n$^{th}$ frame, pixel voltages of red R, green G and blue B are supplied to the first to m$^{th}$ data lines DL1 to DLm, and at the same time, pixel voltages of blank data BK are supplied to the (m+1)$^{th}$ data line DLm+1. During the (n+1)$^{th}$ frame period, negative polar pixel voltages are always applied to the odd numbered data lines DL1, DL3, DL5, . . . , DLm−1, DLm+1, and positive polar pixel voltages are always applied to the even numbered data lines DL2, DL4, DL6, . . . , DLm−2, DLm.

As a result, the data driver 35 and 45 shown in FIGS. 4 and 6 controls the polarity of the data lines DL1 to DLm+1 by a column inversion method where the polarity is alternately inverted between adjacent lines. Because the TFTs of the liquid crystal display panel 33 and 43 are arranged in a zigzag shape between horizontal lines, the liquid crystal display panel 33 and 43 displays the data of a column inversion type, supplied from the data driver 35 and 45, in a dot inversion type as in FIGS. 8a and 8b.

Figures 8A, 8B:
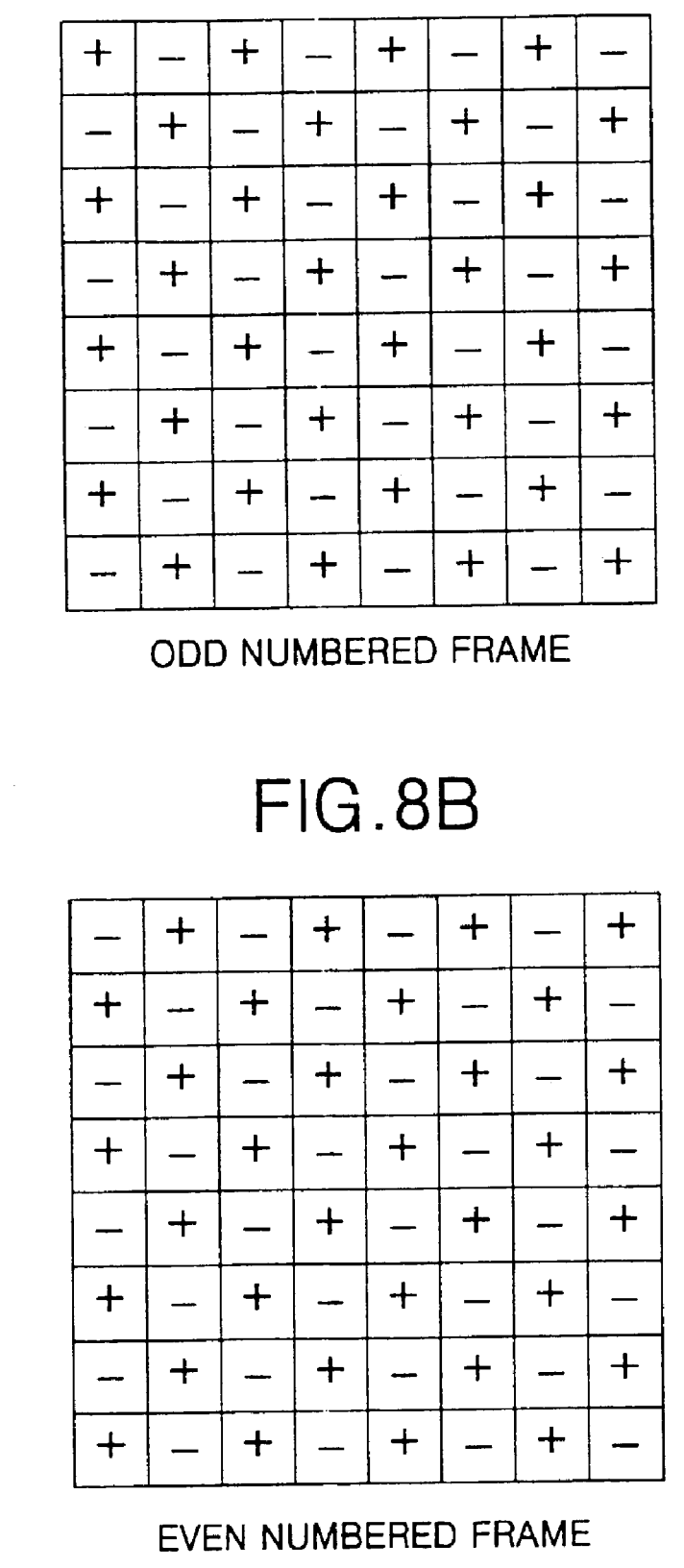

That is, in the odd numbered frame, the liquid crystal display panel 33 and 43, as in FIG. 8a, supply the data voltage of positive polarity to the liquid crystal cells located at the crossings of the odd numbered vertical line and the odd numbered horizontal lines and to the liquid crystal cells located at the crossings of the even numbered vertical lines and the even numbered horizontal lines, and at the same time, supply the data voltage of negative polarity to the liquid crystal cells located at the crossings of the odd numbered vertical lines and the even numbered horizontal lines and to the liquid crystal cells located at the crossings of the even numbered vertical lines and the odd numbered horizontal lines. During the even numbered frame period following the odd numbered frame, the liquid crystal display panel 33 and 43 inverts the polarity of the data voltage contrary to the previous case, as in FIG. 8b.

Because the polarity of the data supplied to the liquid crystal display panel 33 and 43, flickers between lines generated in a horizontal direction or in a vertical direction are lessened, thereby increasing a display quality. Also, the data drivers 35 and 45 controls the data in a column inversion type, so the driving frequency is decreased to decrease the power consumption as compared with the existing dot inversion type data driver.

Figure 9:
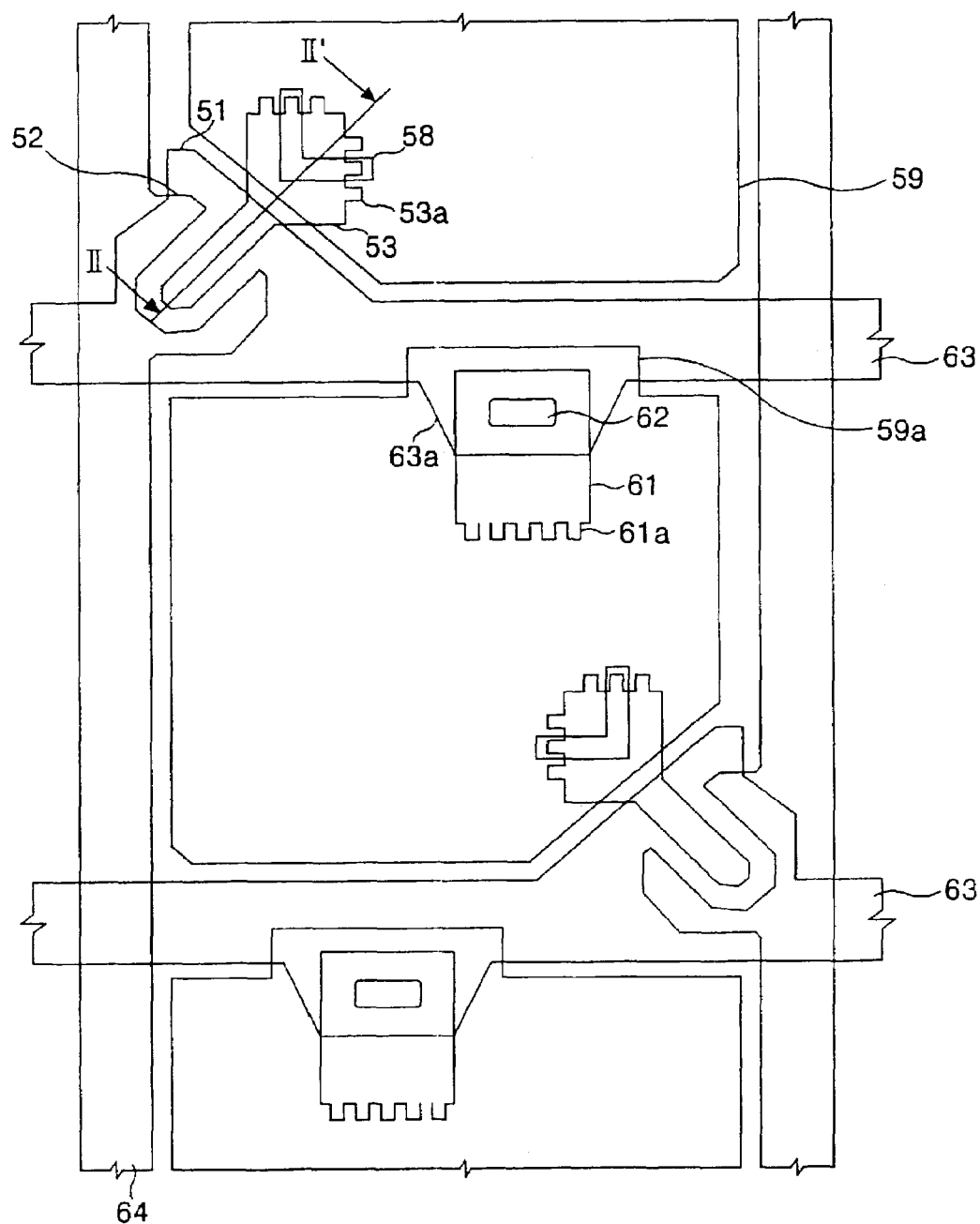
FIG. 9 is a plan view representing an enlarged part of a TFT array according to the first embodiment of the liquid crystal display shown in FIGS. 4 and 6.
Figure 10:
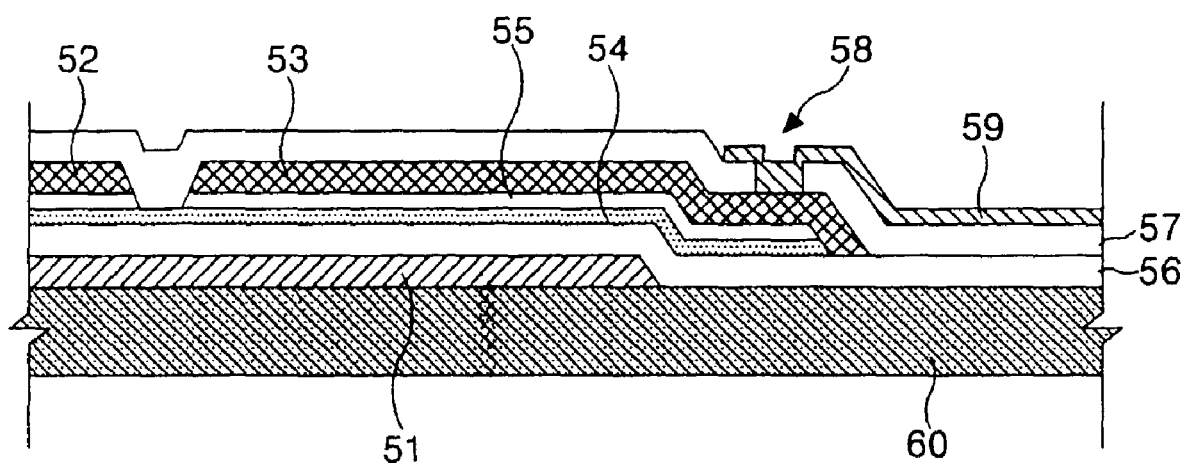
FIG. 10 is a sectional view cutting off along the line II-II' in FIG. 2.

FIGS. 9 and 10 are views representing a TFT array of a liquid crystal display panel according to the first embodiment of the present invention.

Referring to FIGS. 9 and 10, TFTs that are arranged in a zigzag shape between two data lines 64 are formed on a lower glass substrate 60 of a liquid crystal display panel, and a pixel electrode 59 is formed within a pixel area provided between the gate line 63 and the data line 64 on the lower glass substrate 60 for being connected to a drain electrode 53 of the TFT. Also, a storage capacitor (CAP) is formed between the gate line 63 and the pixel electrode 59 on the lower glass substrate 60 of the liquid crystal display panel.

A gate electrode 51 of the TFT and a gate line 63 connected thereto are simultaneously formed on the surface of the lower glass substrate by depositing and patterning a metal. A projecting part 63a projected to the pixel electrode 59 is formed on a lower side of the gate line 63. A gate insulating layer 56 is formed on the entire surface of the lower glass substrate 60 and a gate metal layer including the gate electrode 51 and the gate line 63. A semiconductor layer 54 is formed of semiconductor material on the gate insulating layer 56, and an ohmic contact layer 55 that semiconductor material is doped with impurities is deposited on top of the semiconductor layer 54. On the ohmic contact layer 55 is formed a source electrode 52 of the TFT and a data line 64 connected thereto, and a drain electrode 53 facing the source electrode 52 with a specific channel therebetween.

The source electrode 52 and the drain electrode 53 of the TFT overlap with the gate electrode 51 having the gate insulating layer 56, the semiconductor layer 54 and the ohmic contact layer 55 therebetween. The source electrode 52 reduces a gate-source capacitance Cgs in order to decrease the fluctuation of the voltage applied to liquid crystal, and at the same time, is patterned in a tilt 'U' shape by about 45° toward the pixel electrode 59 so as to lengthen the channel length between the source electrode 52 and the drain electrode 53. One end of the drain electrode 53 is patterned in a shape of being inserted into a hollowed part of the source electrode 52. A capacitor electrode 61 is formed to overlap with the projecting part 63a of the gate line 63 as soon as the data line 64, the source electrode 52 and the drain electrode 53 are formed. Projecting parts 53a, 61a are formed at the edge of the drain electrode 53 and the capacitor electrode 61. Because each edge of the drain electrode 53 and the capacitor electrode 61 is formed in a shape of a comb by the projecting parts 53a and 61a, it is possible to minimize the defects of the pixel electrode 59 caused by the step part of the drain electrode 53 and the capacitor electrode 61.

In this way, after the TFT, the gate line 63 and the data line 64 are formed, a passivation layer 57 of inorganic material or organic material is formed on the entire surface of the lower glass substrate 60. In the passivation layer 57, there is formed a contact hole 58 for exposing part of the drain electrode 53 and a contact hole 62 for exposing part of the capacitor electrode 61. A pixel electrode 59 of transparent conductive material such as indium tin oxide (ITO) is formed on the passivation layer 57. A projecting part 59a is formed on the upper end of the pixel electrode 59 to overlap with the projecting part 63a of the gate line and the capacitor electrode 61. The pixel electrode 59 is connected to the drain electrode 53 and the capacitor electrode 62 via the contact holes 58 and 62.

On the other hand, in the liquid crystal display panel 33 and 43 shown in FIGS. 4 and 6, if masks are not aligned correctly and are a little offset in a process of forming the source electrode 52 and the drain electrode 53 of the TFT, the voltage Vp applied to a liquid crystal cell Clc can severely be deviated between horizontal lines. When a solid line represents a correctly aligned position of the source electrode 52 and the drain electrode 53, if the mask moves upward like an arrow mark 71 from the correctly aligned position (FIG. 11), the capacitance Cgs between the drain electrode 53 and the gate electrode 51 of the TFT formed on an upper horizontal line 72n−1 decreases while the capacitance Cgs between the drain electrode 53 and the gate electrode 51 of the TFT formed on an upper horizontal line 72n increases.

If the deviation of the capacitance Cgs between the drain electrode 53 and the gate electrode 51 increases, as seen in Formula 1, there can occur the deviation of the voltage applied to the liquid crystal cell Clc. On the other hand, in FIG. 12, in a case where the hollowed part of the source electrode 73 faces in a horizontal direction and one end of the drain electrode 74 is inserted into the hollowed part of the source electrode 73 in the horizontal direction, the deviation of the capacitance Cgs between the drain electrode 53 and the gate electrode 51 can increase.

Figure 13:
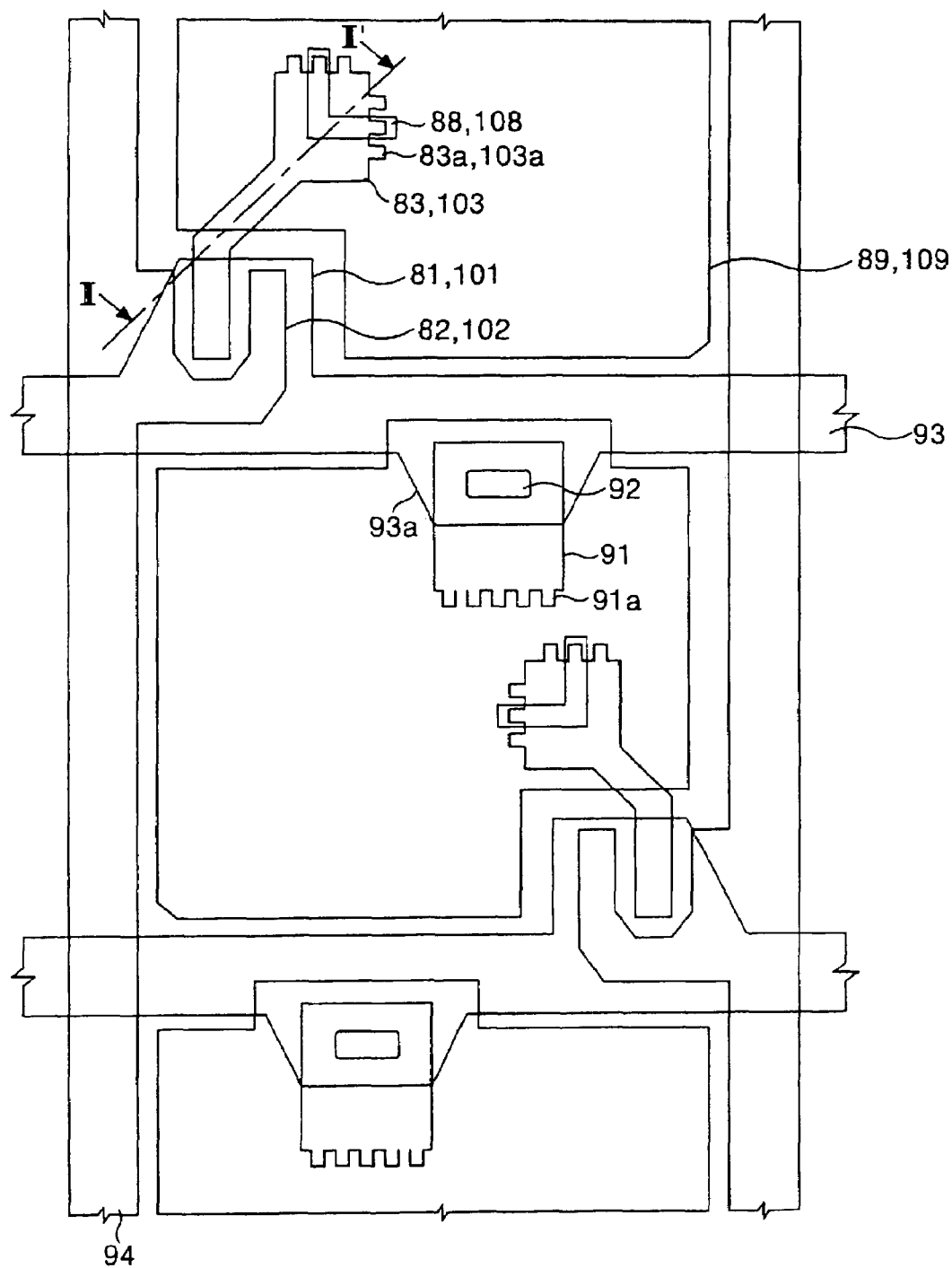
FIG. 13 is a plan view representing an enlarged part of a TFT array according to the second embodiment of the liquid crystal display shown in FIGS. 4 and 6.
Figure 15:
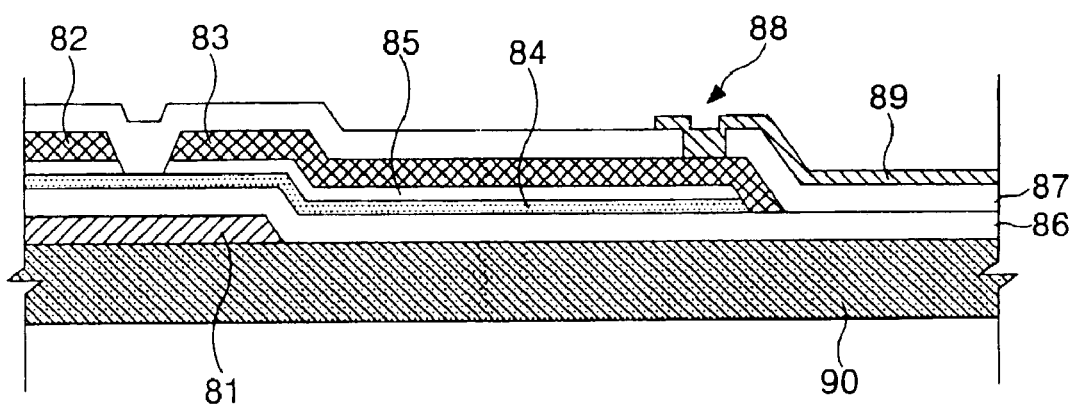
FIG. 15 is a sectional view of the TFT array cutting off along the line III-III' in FIG. 13 in case where the TFT array, shown in FIG. 13, is fabricated using a 5 mask process.

FIGS. 13 to 15 are views representing a TFT array of a liquid crystal display panel according to the second embodiment of the present invention.

Referring to FIG. 13, the TFT array of the liquid crystal display panel according to the second embodiment of the present invention includes a source electrode 82, 102 having a hollowed part that faces upward perpendicularly, and a drain electrode 83, 103 having one end inserted into the hollowed part of the source electrode 82, 102 and facing the source electrode 82, 102.

The hollowed part of the source electrode 82, 102 of the TFT becomes parallel to the data lines 94. Because of this, in a process of forming the source electrode 82, 102 and the drain electrode 83, 103 of the TFT, even if a mask moves in an arrow mark 111 direction, as in FIG. 14, so that the mask is not aligned correctly, there almost no deviation of the capacitance Cgs between the drain electrode 83, 103 and the gate electrode 81, 101.

Such a TFT array is fabricated by a 5 mask process requiring 5 masks or a 4 mask process requiring 4 masks.

FIG. 15 is a sectional view representing the TFT array, shown in FIG. 13, fabricated by a 5 masks process.

Referring to FIG. 15, first of all, gate metal such as aluminum (Al) or copper (Cu) etc. is deposited on the entire surface of a lower glass substrate 90 by a deposition method such as sputtering etc. The gate metal layer deposited on the whole surface has the first mask aligned on top of gate metal layer, and then, it is patterned by a photolithography process. By patterning the gate metal layer in this way, the gate line 93 and the gate electrode 81 are formed simultaneously.

A gate insulating layer 86 is formed on the gate line 93 and the gate electrode 81. The gate insulating layer 86 is formed by depositing gate insulating material such as silicon nitride (SiNx) and silicon Oxide (SiOx) etc. on the entire surface of the lower glass substrate 90 using a Plasma Enhanced Chemical Vapor Deposition (PECVD) process. On the gate insulating layer 86 are deposited a semiconductor layer 84 of semiconductor material and an ohmic contact layer 85 of a semiconductor material doped with impurities. After the semiconductor layer 84 and the ohmic contact layer 85 are deposited on the gate insulating layer 86, the second mask is aligned on top of the layers. Subsequently, the semiconductor layer 84 and the ohmic contact layer 85 are patterned by a photolithography process.

In order to form a data line 94, a source electrode 82 and a capacitor electrode 91 at the same time, a source/drain metal such as chromium (Cr) or molybdenum (Mo) etc. is deposited on the entire surface of the lower glass substrate 90 using a chemical vapor deposition (CVD) method or a sputtering method to cover the gate insulating layer 86 and the semiconductor/ohmic contact layer pattern. In this way, after the source/drain metal is deposited, the third mask is aligned. The data line 94, the source electrode 82, the drain electrode 83 and the capacitor electrode 91 are simultaneously patterned by patterning the source/drain metal by photolithography using a third mask. The source electrode 82 is made in a 'U' shape by a patterning process. A hollowed part of the source electrode 82 makes a gate-source capacitance Cgs smaller and the length of a source-drain channel longer. Projected parts 83a, 91a are formed at each edge part of the drain electrode 83 and the capacitor electrode 91 in order to reduce the defects of the pixel electrode 89 caused by the step of an electrode in a process of forming a pixel electrode, described later. Subsequently, an area between the source electrode 82 and the drain electrode 83 is removed from the ohmic contact layer 85 by a dry-etching using the pattern of the source electrode 82 and the drain electrode 83 as a mask, thereby exposing the semiconductor layer 84. The source electrode 82 and the drain electrode 83 overlaps with the gate electrode 81 and face each other though a channel having a 'U' shape.

After completing the patterning process of the source/drain metal layer and the patterning process of the ohmic contact layer 85, inorganic insulating material such as silicon nitride (SiNx) or silicon oxide (SiOx) etc. or organic insulating material having a small dielectric constant such as acrylic organic compound, benzocyclobutene (BCB), cytop or perfluorocyclobutane (PFCB) etc. is deposited on the entire surface of the lower glass substrate 90 to form a passivation layer 87. The fourth mask is aligned on the passivation layer 87 and a photolithography process is carried out so as to form a contact hole 88 exposing part of the drain electrode 83 and a contact hole 92 exposing part of the capacitor electrode 91.

After a transparent conductive material such as indium tin oxide (ITO), indium zinc oxide (IZO) etc. is entirely deposited on the passivation layer 87, the fifth mask is aligned on top of the passivation layer 87. If the photolithography is carried out using the fifth mask, the pixel electrode 89 is formed in contact with the drain electrode 83 and the capacitor electrode 91 via the contact holes 88 and 91 by patterning the transparent conductive material.

Figure 16:
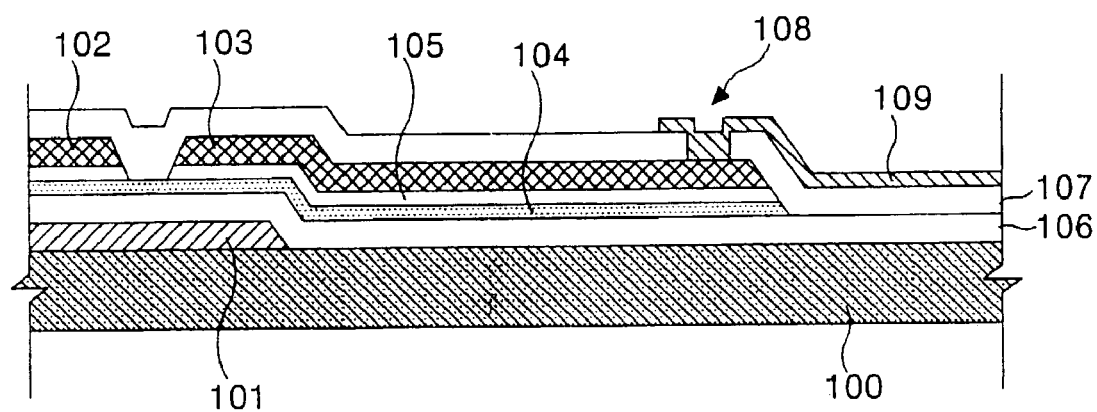
FIG. 16 a sectional view of the TFT array cutting off along the line III-III' in FIG. 13 in case where the TFT array, shown in FIG. 13, is fabricated using a 4 mask process.

FIG. 16 is a sectional view representing a TFT array shown in FIG. 13 fabricated using a 4 masks process.

Referring to FIG. 16, first of all, gate metal such as aluminum (Al) or copper (Cu) etc. is deposited on the entire surface of a lower glass substrate 100 by a sputtering method. The gate metal layer deposited on the whole surface has the first mask aligned on top of the gate metal layer, and then, it is patterned by a photolithography process. By patterning the gate metal layer in this way, the gate line 93 and the gate electrode 101 are formed simultaneously.

A gate insulating layer 106 is formed on the gate line 93 and the gate electrode 101. Semiconductor material, semiconductor material doped with impurities and a source/drain metal are continuously deposited on the entire surface of the gate insulating material 106. A photo resist is formed on the source/drain metal and a diffraction mask or a half-tone mask is aligned as the second mask on top of the photo resist. The second mask includes a light shielding part, a semi-transmitting part or a diffracting part for transmitting about 50% of the incident light, and a transmitting part for transmitting most of the incident light.

The shielding part of the second mask is aligned at the area where the source electrode 102 and the drain electrode 103 are formed, and the semi-transmitting part or the diffracting part of the second mask is aligned at the area where a 'U' shape channel is formed between the source electrode 102 and the drain electrode 103. The transmitting part of the second mask is aligned at the area where the semiconductor material, the semiconductor material doped with impurities and the source/drain metal should all be removed.

An ultraviolet (UV) ray is irradiated via the second mask to the photo resist formed on the source/drain metal, and the photo resist is developed with developing solution after having the mask is removed. Then, the photo resist corresponding to the shielding part of the second mask maintains almost the same thickness as its initial thickness, and the photo resist corresponding to the semi-transmitting part or the diffracting part of the second mask has its thickness reduced down to about 10~50% of the initial thickness. The photo resist corresponding to the transmitting part of the second mask is completely removed so that the underlying gate insulating layer 106 is exposed. After patterning the photo resist, a dry-etching or a wet-etching is carried out, the semiconductor material, the semiconductor material doped with impurities and the source/drain metal are patterned simultaneously.

As a result, the semiconductor layer 104, the ohmic contact layer 105, the source electrode 94, the data line 94, the drain electrode 103 and the capacitor electrode 91 are simultaneously formed using one mask. By this patterning process, the source electrode 102 is patterned in a 'U' shape, and the hollowed part in the 'U' shape is in parallel with the data line 94. A plurality of projecting parts 83a, 103a are formed at the edge of the drain electrode 103 and the capacitor electrode 91. In this way, after the semiconductor layer 104, the ohmic contact layer 105, the source electrode 102, the data line 94, the drain electrode 103 and the capacitor electrode 91 are simultaneously formed, the photo resist pattern is removed.

After the photo resist having been removed, inorganic insulating material such as silicon nitride (SiNx) or silicon oxide (SiOx) etc. or organic insulating material such as acrylic organic compound, benzocyclobutene (BCB), cytop or perfluorocyclobutane (PFCB) etc. is deposited on the entire surface of the lower glass substrate 100. After a passivation layer 107 is formed in this way, the third mask is aligned on the passivation layer 107 and a photolithography process is carried out so as to form a contact hole 108 for exposing part of the drain electrode 103 in the passivation layer 107 and a contact hole 92 for exposing part of the capacitor electrode 91.

After the contact holes 108, 92 are formed, transparent conductive material such as ITO, IZO etc is deposited on the entire surface of the passivation layer 107. The fourth mask is aligned on the transparent conductive material. If the photolithography process is carried out using the fourth mask, the pixel electrode 109 is formed in contact with the drain electrode 103 and the capacitor electrode 91 via the contact holes 108 and 92 by patterning the transparent conductive material.

On the other hand, the TFT array of the liquid crystal display panel shown in FIGS. 9 and 12 can be fabricated by a 5 mask process using 5 masks or a 4 mask process using 4 masks that include at least one diffraction mask or a half-tone mask.

As described above, the liquid crystal display according to the present invention has the TFTs of the liquid crystal display panel arranged in a zigzag shape between adjacent two data lines, and the liquid crystal display panel driven by a column inversion type data driver, thereby minimizing power consumption and improving display quality at the same time. Also, in the liquid crystal display and the fabricating method thereof according to the present invention, the source electrode of the TFTs arranged in a zigzag shape between the adjacent two data lines is patterned in a 'U' shape in parallel with the data line, and the one end of the drain electrode is made to be inserted into the hollowed part of the source electrode in a data line direction, so that even if the mask is not aligned correctly, the deviation of the capacitance between the drain electrode and the gate electrode can be minimized. As a result, the liquid crystal display and the fabricating method thereof according to the present invention is possible to make the parasitic capacitance of the TFT uniform.

It will be apparent to those skilled in the art that various modifications and variations can be made in the method of manufacturing a flat panel display device of the present invention without departing from the spirit or scope of the invention. Thus, it is intended that the present invention cover the modifications and variations of this invention provided they come within the scope of the appended claims and their equivalents.

What is claimed is:

1. A liquid crystal display, comprising:
a plurality of first thin film transistors for supplying data from a plurality of first data lines to a plurality of first pixel electrodes; and
a plurality of second thin film transistors for supplying data from a plurality of second data lines adjacent to the first data lines to a plurality of second pixel electrodes adjacent to the first pixel electrodes in each data line direction such that the first and second thin film transistors are arranged in a zigzag shape;
a gate driver for sequentially supplying a scan signal to the first and second thin film transistors;
a single data driver for supplying image data to the first and second data lines, the data driver shifting the image data by one channel to be supplied to the first and second data lines when the scan signal is applied to the second thin film transistors as compared with the image data supplied to the first and second data lines when the scan signal is applied to the first thin film transistors, wherein the one channel corresponds to one of the first and second data lines, wherein the data driver drives the first and second data lines in column inversion type wherein a polarity of the image data is alternately inverted between adjacent first and second data lines, and wherein the data driver is connected with the first and second data lines in same direction, and
wherein a source electrode of each thin film transistor having a 'U' shape is connected to the data line and a drain electrode of the thin film transistor is inserted into a hollowed part of the source electrode in the data line direction.

2. The liquid crystal display according to claim 1, wherein the hollowed part faces upward perpendicularly.

3. The liquid crystal display according to claim 1, wherein the hollowed part of each thin film transistor is parallel to the data line.

4. The liquid crystal display according to claim 1, further comprising:
a plurality of gate lines crossing the data line and connected to a gate electrode of the thin film transistor for supplying scanning voltage to the gate electrode of the thin film transistor.

5. The liquid crystal display according to claim 4, wherein the first thin film transistor is located at a crossing of the first data line and a first gate line, and
the second thin film transistor is located at a crossing of a second gate line adjacent to the first gate line and the second data line.

6. The liquid crystal display according to claim 4, further comprising:
a first insulating layer formed between the source-drain electrodes of the thin film transistor and the gate electrode of the thin film transistor;
a semiconductor layer formed between the first insulating layer and the source-drain electrodes of the thin film transistor;
an ohmic contact layer formed between the semiconductor layer and the source-drain electrodes of the thin film transistor;
a capacitor electrode formed on the first insulating layer and overlapping with at least part of the gate line;
a second insulating layer formed on the first insulating layer to cover the thin film transistor, the data line, the gate line and the capacitor electrode, wherein the second insulating layer has contact holes exposing the drain electrode and the capacitor electrode; and
a pixel electrode formed on the second insulating layer, the pixel electrode connected to the drain electrode and the capacitor electrode via the contact holes.

7. The liquid crystal display according to claim 6, wherein at least one side edge of each of the drain electrode and the capacitor electrode has a plurality of protrusions.

8. A liquid crystal display comprising:

a liquid crystal display panel having m×n liquid crystal cells Clc arranged in a matrix type;

a gate driver for sequentially supplying a scan signal to gate lines GL1 to GLn of the liquid crystal display panel;

a data driver for supplying image data to data lines DL1 to DLm+1 of the liquid crystal display panel, the data driver shifting the image data by one channel to be supplied to the data lines DL2 to DLm+1, except the first data line DL1, when the scan signal is applied to one of the even-numbered gate lines as compared with the image data supplied to the data lines DL1 to DLm, except the (m+1)$^{th}$ data line DLm+1, when the scan signal is applied to one of the odd-numbered gate lines, wherein the one channel corresponds to one of the data lines DL1 to DLm+1, wherein the data driver drives the data lines DL1 to DLm+1 in column inversion type wherein a polarity of the image data is alternately inverted between adjacent data lines, and wherein the data driver is connected with the data lines DL1 to DLm+1 in same direction; and a timing controller for controlling the gate driver and the data driver, wherein thin film transistors (TFTs) are arranged in a zig-zag shape between two adjacent data lines (m+1) DL1 to DLm+1 crossing n gate lines GL1 to GLn, wherein source electrodes of the TFTs connected to one of the odd-numbered gate lines are connected with the first to the m$^{th}$ data lines DL1, DL2, DL3 . . . to DLm, not including DLm+1, and source electrodes of the TFTs connected to one of the even-numbered gate lines are connected with the second to the (m+1)$^{th}$ data lines DL2, DL3, DL4 . . . to DLm+1, not including DL1, and wherein drain electrodes of the TFTs located on odd numbered horizontal lines are connected to pixel electrodes of the liquid crystal cells Clc on one side of the cells, and drain electrodes of the TFTs located on even numbered horizontal lines are connected to pixel electrodes of the liquid crystal cells Clc on another side of the cells, wherein each of the source electrodes has a 'U' shape and each of the drain electrodes is inserted into a hollowed part of the corresponding source electrode in the data line direction.

9. The liquid crystal display panel of claim 8, further comprising a storage capacitor formed between a gate line and a pixel electrode.

10. A display device comprising, a display panel having n gate lines GL1 to GLn and m+1 data lines DL1 to DLm+1 crossing each other to define n×m pixels;

a thin film transistor (TFT) connected to each pixel, wherein the TFTs connected to one of the odd-numbered gate lines are connected to the data lines DL1, DL2, DL3 . . . to DLm, not including DLm+1, and the TFTs connected to one of the even-numbered gate lines are connected to the data lines DL2, DL3, DL4 . . . to DLm+1, not including DL1;

a gate driver for sequentially supplying a scan signal to the gate lines GL1 to GLn; and a data driver for supplying video data to the display panel, the data driver shifting the video data by one channel to be supplied to the data lines DL2 to DLm+1, except the first data line DL1, when the scan signal is applied to one of the even-numbered gate lines as compared with the image data supplied to the data lines DL1 to DLm, except the (m+1)$^{th}$ data line DLm+1, when the scan signal is applied to one of the odd-numbered gate lines, wherein the one channel corresponds to one of the data lines DL1 to DLm+1, wherein the data driver drives the data lines DL1 to DLm+1 in column inversion type wherein a polarity of the image data is alternately inverted between adjacent data lines, and wherein the data driver is connected with the data lines DL1 to DLm+1 in same direction.

11. The display device of claim 10, wherein when the scan signal is supplied to one of the odd-numbered gate lines, a blank data is supplied to the data line DLm+1.

12. The display device of claim 10, wherein when the scan signal is supplied to one of the even-numbered gate lines, a blank data is supplied to the data line DL1.

13. The display device of claim 10, wherein the display device is a liquid crystal display (LCD) device.

* * * * *